United States Patent Office

2,990,332
Patented June 27, 1961

2,990,332
PHARMACEUTICAL PREPARATIONS COMPRISING CATION EXCHANGE RESIN ADSORPTION COMPOUNDS AND TREATMENT THEREWITH
John W. Keating, Gainesville, Fla., assignor to Wallace & Tiernan Inc., a corporation of Delaware
No Drawing. Filed Apr. 2, 1958, Ser. No. 726,010
15 Claims. (Cl. 167—65)

This application is a continuation-in-part of my application Serial No. 527,130, filed August 8, 1955, entitled Resin Complex of Amphetamine, my application Serial No. 582,346, filed May 3, 1956, entitled Resin Complex of Antihistamine, and my application Serial No. 598,215, filed July 16, 1956, entitled Cation Resin Adsorption Products of Amine Pharmaceutical Compounds and Treatment Therewith, all now abandoned.

The invention relates to pharmaceutical preparations comprising cation exchange resin adsorption compounds and to their administration to patients.

More particularly the invention relates to compositions in dosage unit form comprising a sulphonic acid cation exchange resin having adsorbed thereon (ionically bound thereto) a cation of a basic nitrogen containing organic drug, the cross linkage, and the particle size of the adsorption compound, being such that the drug is slowly and relatively uniformly released by the gastric and intestinal juices at an effective therapeutic level throughout the period of time that the compound is in the stomach and for a substantial period of time that it is in the intestine; the maximum amount released in one hour by the gastric juice being preferably not more than one-half the total amount of adsorbed drug, and the minimum amount released in three hours on exposure to gastric juice being preferably at least 10 percent of the total of adsorbed drug.

The adsorption compound of this invention, as described above, has the characteristic of so greatly decreasing the toxicity as compared to the same amount of the common salt or the free base that the amount of basic drug present in a unit dose of the adsorption compound can be from two to 20 times the amount of drug present in the common salt or free base without substantial increase in toxicity or deleterious side effects. The sustained release of the drug from the adsorption compound and the great decrease in toxicity is obtained by careful control in the preparation of the adsorption compound and the proper selection of particle size, cross linkage, functional groups, and other conditions as set forth below.

A large number of laboratory and clinical tests have been conducted to determine suitable types of ion exchange resins and suitable organic compounds containing basic nitrogen groups which can be adsorbed on the ion exchange resins to give the characteristics set forth above. Most of the work was carried out with nitrogen heterocyclic compounds and amines, the term amine being used to define any compound having in it a nitrogen containing group derived from ammonia by replacement of hydrogen by one or more univalent hydrocarbon radicals.

The adsorption compound of this invention can be orally administered to a patient with substantial advantages in dosage unit amounts, varying from an amount of minimum therapeutic effectiveness to just below the amount at which the product is unsafe. The minimum unit dose of drug base in my adsorption compound must be substantially above the minimum unit dose of the common salt or drug base itself in order to have therapeutic effectiveness. The maximum amount to obtain maximum therapeutic effectiveness without substantial untoward side effects is far above the maximum amount of the common salt or the unadsorbed drug base. Depending upon the type of drug adsorbed, the unit dose may vary from approximately .2 milligram to 2000 milligrams.

The invention is particularly applicable to relatively toxic, gastro-intestinal absorbent, pharmaceutical basic drugs having an oral LD-50 in rats of between approximately 50 to 3000 mg. per kg., and for dosage amounts of such drugs in the adsorption compound which are substantially more than (approximately at least twice) the average unit dose for the common drug salt, or drug base itself.

The invention has its greatest advantages for those relatively toxic and quick acting amines and nitrogen heterocyclic compounds which in base or common salt form cannot be orally administered to a patient in sufficient amount so as to be therapeutically effective throughout a period of 12 hours or longer without undesirable side effects and which, therefore, are recommended for administration to the patient in smaller unit amounts to be orally administered at least twice in 12 hours.

The quick acting relatively toxic amines include the adrenergic amines such as amphetamine, methamphetamine, and ephedrine, and many of the antihistamines. The quick acting relatively toxic heterocyclic nitrogen compounds include several antihistamines such as pyrilamine and pyribenzamine.

Heretofore, basic pharmaceutical compounds have been orally administered to patients in the form of their free bases or their common salts; such as, for example, the amine sulphates, phosphates, and tartrates. These common salts are either water soluble or, if not, they are readily soluble in the gastric juices of the stomach. Only a small proportion of such soluble compounds are efficiently utilized. Furthermore, in order to obtain the desired effect without too many administrations to the patient in the day (three or four times a day is the most that the patient can be expected to take regularly), the dosage of the soluble compound is administered in such large amount that there is a quick peak effect which takes place within the first hour, followed by a regression of the maximum effect. The more of the soluble compound that is given to the patient, the higher is this peak with not only high therapeutic effect but also high deleterious side effects and toxicity. This peak effect limits the amount of soluble amine drug that can be given to a patient in a single dose, so that it is necessary to give many pharmaceutical amines to a patient in a unit dosage amount which will be effective only three or four hours, this unit dosage, for example, being given to the patient before or after each meal and upon retiring.

Attempts have been made to eliminate or to decrease the peak effect; thus, multi-coated tablets and pills within pills have been made but such materials are quite non-uniform in their action, in some cases the coating being completely dissolved before it leaves the stomach and in other instances not even the first coating being dissolved.

Also attempts have been made to produce adsorption compounds which are inactive in the stomach and which do not become active until contacted by the intestinal juice.

I have not seen any indication that anyone prior to my invention ever conceived even the general idea of reacting pharmaceutical drugs with cation exchange resins to obtain an immediate acting compound which would have sustained therapeutic effectiveness throughout the period of time that the compound was in the stomach and for a substantial period after reaching the intestine, or of producing immediate acting pharmaceutical preparations of relatively toxic drugs which would be administered once every 12 hours instead of the usual three or four times.

An object of this invention, therefore, is to provide an immediate acting pharmaceutical preparation which is effective at least eight hours or longer in a single dose without deleterious side effects. The patient thus may be given a dosage unit such as a capsule, tablet, or an amount of syrup before retiring at night and the therapeutic effect will last until the patient awakens in the morning, or the patient may be given a dosage unit in the morning and it will be sufficiently effective to give him until evening and in many cases for a full 12 hours or longer.

Another object is to provide a pharmaceutical dosage unit which contains at least twice the average dose of therapeutic base which is present in the common drug salt.

A further object is to provide a homogeneous pharmaceutical drug compound which without the necessity of complicated and expensive enteric coating procedures will immediately release its drug continuously over a long period of time, so that there is no quick spurt of harmful release followed by a quick depression, as is the case for uncoated soluble compounds and to a considerable extent even for specially coated soluble compounds in spite of many attempts to remedy this. Instead, in applicant's product there is a plateau of uniform release of the drug at an effective helpful level without reaching a harmful level.

The dosage unit composition of this invention requires the preparation of an ion exchange adsorption compound that has the property of being slowly and continuously released at an effective and relatively non-toxic level throughout the period of time the composition is in the stomach and for a substantial period of time while it is in the intestine.

I have discovered that organic drug compounds containing a basic nitrogen group will react with sulphonic acid cation exchange resins, under certain conditions described below, to give adsorption compounds which when orally administered to a patient have a continuous but incomplete release by gastric juice throughout the period of time that the drug is in the stomach and which also have a release for at least another hour by intestinal juice when the adsorption compound is in the intestine. On the other hand, these same drug compounds reacted with the carboxylic acid cation exchange resins released these drugs so rapidly in the stomach that practically none was available for release in the intestine, and such compounds were thus of practically no value for sustained release preparations.

The types of basic functional groups in the molecule influence the adsorption and elution characteristics of the adsorption compound as discussed below, but the controlling factors in producing a satisfactory adsorption compound for a sustained release drug preparation are the use of a sulphonic acid cation exchange resin to adsorb and chemically combine with the organic drug containing basic nitrogen groups, the use of such a drug which is therapeutically effective in its unadsorbed and released form, and a suitable cross linkage and/or particle size of the adsorption compound, as will be described below.

The only known exception to the suitability of all therapeutically effective organic drug compounds containing basic nitrogen groups is the class of antibiotics which are biologically unstable in gastric juice or hydrochloric acid. Streptomycin and like antibiotics belong to this class and are unsuitable for the practice of this invention in the form of their IR–120 sulphonic acid adsorption compounds, since most of the antibiotic is rendered biologically ineffective by the action of the gastric juice before it reaches the intestine. It is believed that this is due to the fact that with slow release adsorption compounds the antibiotic in small amounts as it is released is in contact with an excess of acid and is inactivated, whereas with large amounts of unadsorbed streptomycin as generally administered there is insufficient acid present, compared to the streptomycin, and much of the streptomycin is able to reach the intestine without being inactivated. For purposes of definiteness, biologically unstable drugs are those which lose at least 50 percent of their therapeutic effectiveness when in contact with a 100 percent excess of .1 N HCl for two hours.

The other controlling factors are the cross linkage of the adsorption compound and the size of the particles of this compound in the sustained release preparation.

I have discovered that the rate of release of drugs from sulphonic acid cation exchange resins having basic drugs adsorbed thereon varies widely with the type of drug adsorbed, so that in some cases even the sulphonic acid adsorption compounds are not suitable for sustained release preparations, unless they are modified by changing the cross linkage and/or particle size. Thus, in the case of amphetamine, ephedrine, and like drugs the fine particle size resin adsorption compounds, such as that of −200 mesh, are not suitable for sustained release when made with the sulphonic acid cation exchange resins having 7 to 8 percent cross linkage, such as are the IR–120 resins; but such adsorption compounds when of −10 to +50 mesh particle size are very valuable for sustained release preparations. On the other hand other sulphonic acid drug adsorption compounds such as those containing antihistamines and narcotic nitrogen heterocyclic compounds give superior results when used in particle size of −80 to +400 mesh.

Moreover, in many instances fine particle size adsorption compounds of −80 to +400 and finer are desirable over coarse particles even in bead form in order to have less irritation of the gastro-intestinal tract and particularly in order to have a smoother preparation when administered in the form of syrup or other aqueous suspension. By controlling the cross linkage, as below discussed, I can make sustained release preparations even with −80 to +400 mesh particles of sulphonic acid cation exchange adsorption compounds, of amphetamine, ephedrine, and like amines.

By suitable cross linkage, preferably also with controlled particle size, I can make a drug adsorption compound in which not more than 50 percent of the bound drug is released by a one-hour elution with simulated gastric juice, and preferably at least 10 percent is released by such juice in three hours, whereby the adsorption compound (calculated as drug base) can be given in twice the average dose of the unadsorbed drug base, or its common salt (calculated as drug base), without any greater toxicity or untoward side effects than that of said average dose of the drug base or common salt. This makes possible the oral administration of a drug at intervals twice as long as its normal interval, for example, once every 12 hours or more instead of three or four times per day.

The 50 percent upper limit of release of bound drug, while not a strict limitation for all purposes is a practical upper limit. Likewise the 10 percent lower limit can be less but it has been found that with 10 percent and higher release by gastric juice in three hours most of the drug is utilized before being eliminated from the body.

The details of conditions for preparing suitable compositions will be set forth as the following description progresses, reference being had to the various tables giving elution data.

The details of a standard test, which was utilized for obtaining all of the elution data disclosed in this case, except where indicated otherwise, are given in column 41, lines 3–29. The percolation elution method is used by the U.S. Food and Drug Administration and by the Control Department of assignee not only for evaluating new resin drugs but also for evaluating the uniformity of sulphonic acid drug adsorption compounds being manufactured.

My first work was carried out on amphetamine. I made an aqueous suspension of an 80 mesh (XE–64) carboxylic cation exchange resin, added it to a beaker, stirred, and then added the amphetamine to the suspension in small amounts at short intervals of time, testing the suspension for alkalinity. The amphetamine reacted with the carboxylic acid resin, as shown by decrease in alkalinity, and then more amphetamine was added until this was reacted, until finally saturation was attained. The substance was removed from the beaker and washed with water.

The behavior of the amphetamine resin adsorption compound was ascertained by the exposure of the material to 25 and 50 milliliter volumes of .1 N hydrochloric acid (as a substitute for gastric juice) for periods of one, two, and three hours at 37° centigrade.

It was found that with the amphetamine adsorption compound obtained with the 80 mesh carboxylic acid cation exchange resin (and which itself was approximately 80 mesh particle size) that 97½ percent of the bound amphetamine was released in one hour. This amphetamine adsorption compound was only slightly less toxic than the amphetamine sulphate or amphetamine phosphate. It could not be used in twice the average unit dosage amount for the amphetamines sulphate or phosphate (calculated as amine base) and was unsuitable to give sustained effectiveness beyond the normal three or four hour period of the common salt.

I then repeated my work and tests substituting a coarse 40 mesh carboxylic acid cation exchange resin (Amberlite IRC-50) for the 80 mesh resin previously used. In this case there was evidence of a much slower rate of release, only approximately 60 percent of the bound amphetamine being eluted in the first hour as compared to the 97½ percent eluted in the first hour for the fine particle size resin. At the end of two hours around 75 percent had been released and at the end of three hours over 80 percent of the amphetamine had been released.

It was first believed that the coarse mesh carboxylic acid-amphetamine resin compound would be suitable for administration to a patient in a single dose to be effective without deleterious side effects for eight hours or longer. Animal tests, however, showed that this was not true and that the product was only slightly better for sustained effectiveness than the unadsorbed amphetamine sulphate or amphetamine phosphate. The product could not be given in double the normal or average dosage amount. Later it was determined after numerous tests that adsorption compounds which release more than 50 percent of their bound amine on exposure to simulated gastric juice for one hour were not suitable for sustained uniform effectiveness, when administered in twice the normal or average dosage amount for the common amine salt, all dosage amounts being figured as amine base.

I also decided to prepare and test by my elution testing process the adsorption compound prepared by reacting a sulphonic acid cation exchange resin with amphetamine. I used a sulphonic acid cation exchange resin which had been made in accordance with the process disclosed in United States Patent 2,366,007. The product I used had been obtained under the trade name Amberlite IR-120 and at that time the particular product used by me had a particle size such that 90 percent was retained on a 40 mesh screen, 5.67 percent was retained on a 20 mesh screen, and 3.33 percent on a 60 mesh screen. The amphetamine adsorption compound obtained had substantially the same particle size.

The sulphonic acid cation exchange adsorption compound of amphetamine was made by suspending the Amberlite IR-120 resin in distilled water, adding an amount of amphetamine base sufficient to yield a product containing approximately 40 percent amphetamine base and then stirring the mixture for two hours.

The adsorption compound made by the above process was then subjected to gastric and intestinal tests using simulated gastric juice and simulated intestinal juice.

The elution test showed that this product would be slowly and uniformly released by the gastric juices of the stomach throughout a four hour period and would also be released slowly and uniformly by the intestinal juices for a four hour period of time. For example, approximately 20 percent of the amphetamine was released by the simulated gastric juice in one hour. A little over 30 percent was released after four hours exposure to the stimulated gastric juice.

On the basis of the laboratory tests the product was filled into capsules, each capsules containing 20 mg. of amphetamine (10 mg. of d and 10 mg. of dl amphetamine resin complexes). Patients were given single capsules as a daily dose. Clinical results show that the capsules were effective in suppressing appetite and inducing mood amelioration over approximately a 12 hour period, and when taken by the patient in the morning the individual did not require further medication until the following morning. The single dose of 20 mg. administered in the morning appeared to be substantially superior to 10 mg. dosages four times daily and gives less in the way of untoward reactions such as physiologic over stimulation and insomnia. The product can also be administered in tablet form.

On the basis of the successful tests on the adsorption compound made by reacting amphetamine with the coarse particle size sulphonic acid cation exchange resin, other basic drugs were prepared and tested with various ion exchange resins, various particle sizes, and various degrees of cross linkage.

The purpose of the tests was to enlarge the scope of the invention beyond amphetamine so as to obtain other drug adsorption compounds which could be orally administered to a patient in a dosage amount at least twice that of the normal or average dosage amount for the common drug salt (the amounts being calculated as drug base), and which would be therapeutically effective throughout a period of eight hours or longer with an oral LD-50 in rats of more than twice that of the common amine salt.

It was found that to obtain these results, it was essential to use a sulphonic acid cation exchange resin as the acid to react with the basic drug to form the resin salt or adsorption compound. It was also found that a substantial proportion of the drug must be bound to the sulphonic acid resin within the matrix of the resin. The exact amount within the matrix of the resin is difficult to determine quantitatively, but it was found that a measure of this amount adsorbed in the matrix was the amount of drug eluted from the resin adsorption compound by a mixture of .07 N hydrochloric acid containing .03 N sodium chloride (or simulated gastric juice) in one hour. Not more than 50 percent of the total bound drug should be eluted in one hour by this eluent. Furthermore, the elution rate can be too slow. At least 10 percent in three hours of the bound drug should be released by the .07 N HCl-0.3 N NaCl in order to have efficient utilization of the drug without impractical dosage amounts.

It was also found that the obtaining of the above conditions depended upon the type of drug, the particle size of the sulphonic acid cation exchange resin, and of the resulting adsorption compound, and also upon the cross linkage of the sulphonic acid cation exchange resin.

The importance of particle size becomes apparent on grinding the IR-120 amphetamine-sulphonic acid resin complex consisting of beads of −20+40 mesh to finer particle size and running both percolation and batch elution tests. The ground resin adsorption compound of amphetamine, having a particle size of −100 mesh, released over 60 percent of amphetamine in the first hour upon exposure to simulated gastric juice. The therapeutic undesirability of this fine mesh adsorption compound was confirmed on animal and clinical tests.

The following Table I records the analytical data on the various mesh size samples of the unground and ground amphetamine resin complex containing approximately 100 mg. of drug and eluted with 50 ml. of simulated gastric juice in a period of one hour for three successive periods.

bined amine given under "1st Hr.," "2nd Hr.," and "3rd Hr. Total."

TABLE II.—EFFECT OF C.L. AND PARTICLE SIZE ON ELUTION OF AMINE SULPHONIC ACID COMPLEXES

| Resin | Percent C.L. | Mesh Size | Primary Amine | | | | Secondary Amine | | | |
|---|---|---|---|---|---|---|---|---|---|---|
| | | | Amphetamine | | | | Ephedrine | | | |
| | | | Percent Comp. | 1st Hr. | 2nd Hr. | 3d Hr. Total | Percent Comp. | 1st Hr. | 2nd Hr. | 3d Hr. Total |
| XE-176 | 1 | −60+90 | 33.3 | 76.0 | 17.1 | 100% | 31.9 | 84.4 | 17.8 | 108.2 |
| | | −100+150 | 29.5 | | Gel | | 33.1 | | Gel | |
| C-25 | 2 | | 35.8 | 54.0 | 20.7 | 85.5 | 38.0 | 70.0 | 19.6 | 95.4 |
| IR-120 | 8-9 | +40 | 40.7 | 32.7 | 17.6 | 57.9 | 34.01 | 27.1 | 19.8 | 58.7 |
| XE-69 | 8-9 | −100+400 | 35.8 | 64.6 | 11.0 | 78.4 | 37.2 | 82.3 | 19.3 | 105.5 |
| | | +40 | 19.0 | 23.3 | 12.1 | 44.2 | 25.1 | 35.6 | 16.1 | 62.3 |
| XE-144 | 15-16 | −40+60 | 19.4 | 29.8 | 15.0 | 55.1 | 25.1 | 45.6 | 17.6 | 74.9 |
| | | −60+80 | 20.2 | 30.3 | 15.8 | 54.1 | 27.1 | 44.3 | 20.9 | 78.3 |
| | | −80 | 20.2 | 42.5 | 21.8 | 75.3 | 26.9 | 65.6 | 20.5 | 94.4 |

TABLE III.—EFFECT OF C.L. AND PARTICLE SIZE ON ELUTION OF SULPHONIC ACID COMPLEXES

| Resin C.L. | Mesh Size | Tertiary Nitrogen Cmpd. | | | | Quaternary Nitrogen Cmpd. | | | |
|---|---|---|---|---|---|---|---|---|---|
| | | Dihydrocodeinone | | | | Methyl Scopolamine | | | |
| | | Percent Comp. | 1st Hr. | 2nd Hr. | 3d Hr. Total | Percent Comp. | 1st Hr. | 2nd Hr. | 3d Hr. Total |
| XE-176, 1% | −60+90 | 14.5 | 18.0 | 16.1 | 49.0 | 25.7 | 37.5 | 21.0 | 66.00 |
| | −100+150 | 15.4 | | Gel | | 25.3 | | Gel | |
| C-25, 2% | | 37.2 | 18.2 | 13.8 | 41.0 | 48.6 | 31.3 | 14.0 | 53.8 |
| IR-120, 8-9% | +40 | 14.14 | 7.1 | 6.3 | 19.1 | 26.3 | 15.3 | 9.8 | 32.1 |
| XE-69, 8-9% | −100+400 | 12.3 | 12.4 | 9.7 | 31.6 | 22.9 | 33.9 | 15.4 | 60.5 |
| | +40 | 8.0 | 10.1 | 6.8 | 21.6 | 19.8 | 19.6 | 9.5 | 35.3 |
| XE-144, 15-16% | −40+60 | 9.1 | 13.0 | 7.7 | 27.2 | 19.8 | 25.6 | 12.2 | 45.3 |
| | −60+80 | | | | | 22.6 | 27.3 | 12.4 | 46.5 |
| | −80 | 12.6 | 17.1 | 11.5 | 36.6 | 24.2 | 37.5 | 15.0 | 60.1 |

TABLE I

| Sample | Mesh Size | Percent Amphetamine | Elution | | | Total in 3 Hrs. |
|---|---|---|---|---|---|---|
| | | | 1 Hr. | 2 Hr. | 3 Hr. | |
| A-319 | −20+40 | 39.99 | 37.5 | 20.0 | 11.0 | 68.5 |
| 79-07A | −20+40 | 38.40 | 35.2 | 17.2 | 10.4 | 62.8 |
| 79-07B | −20+40 | 32.02 | 39.3 | 21.9 | 12.9 | 66.6 |
| 79-07B1 | +40 | 33.13 | 45.4 | 18.5 | 13.3 | 77.2 |
| 79-07B2 | −40+60 | 31.61 | 52.8 | 21.8 | 11.5 | 86.1 |
| 79-07B3 | −60+80 | 32.17 | 59.4 | 23.5 | 11.0 | 83.9 |
| 79-07B4 | −80+100 | 30.88 | 58.5 | 21.0 | 9.9 | 89.4 |
| 79-07B5 | −100 | 32.00 | 65.5 | 18.1 | 10.0 | 93.6 |

The IR-120 resin used in my test, however, had a cross linkage with divinylbenzene of approximately eight to nine percent. Tests were then conducted on a sulphonic acid cation exchange resin of 200 mesh mesh particle size having a cross linkage of 15 percent. It was found that with a higher cross linkage the finer particle size resin adsorption compound obtained had elution characteristics in which substantially less than 50 percent of the amine was eluted in the first hour with simulated gastric juice and the product was satisfactory at double the normal or average dosage amount over an eight to 12 hour period.

The following Tables II and III show the effect of cross linkage and particle size on the elution of amine sulphonic acid adsorption compounds. The terms XE-176, C-25, IR-120, XE-69, and XE-144 all refer to sulphonic acid cation exchange resins which have been reacted with divinylbenzene to the extent shown under the column headed C.L., C.L. also meaning cross linkage. The elution data was obtained by percolating simulated gastric juice through the resin adsorption compound having the percentage of adsorbed amine shown under "Percent Comp." and the percentage of total combined amine given under "1st Hr.," "2nd Hr.," and "3rd Hr. Total."

The above tables illustrate the effect of particle size and cross linkage on the rate and degree of release of different types of drugs from their adsorption compounds.

The cross linkage of the sulphonic acid cation exchange resins and consequently that of the adsorption compound produced with amines, heterocyclic nitrogen compounds, and other organic compounds containing a basic nitrogen group is suitably between approximately 1.0 percent and 20.0 percent and the particle size may vary between approximately 10 mesh and 400 mesh, the finer particle sizes being used with the higher cross linkage.

The properties of the adsorption compound will also vary with the type of drug used. In general, for the beta phenalkyl amines and like adrenergic amines, such as amphetamine and ephedrine, with a cross linkage of approximately 5 to 9 percent, a suitable particle size is between 10 and 50 mesh. Coarser particle size than 10 mesh can be used but it is not generally practical, and for finer particle size than 50 mesh the cross linkage must be greater than 9 percent. For many other amines and tertiary and quaternary amines and for nitrogen heterocyclic compounds where the sulphonic acid cation exchange resin is cross linked to 5 to 9 percent, the particle size of the resin complex should preferably be between 100 and 400 mesh. With coarser particle size or higher cross linkage the release in one hour becomes smaller and the dosage amount must be increased. However, for atropine the particle size made very little difference as shown in Table VI infra.

In some instances, there is a minimum amount of adsorbed drug which will give satisfactory results. Thus, for atropine, which is a heterocyclic compound, the minimum amount of adsorbed atropine on a sulphonic acid cation exchange resin is approximately two percent. For amphetamine and in general for primary, secondary, and quaternary amines, no minimum amount has been found although for practical purposes a minimum of two percent can be given as a general minimum for all pharmaceutical amines.

The heterocyclic nitrogen adsorption compounds are, in general, more difficult to prepare than the amine adsorption compounds, and act differently than the amine adsorption compounds. Tests on sulphonic acid resin complexes of atropine showed that the amount of atropine on the resin should not be less than approximately two percent. Apparently at below two percent by weight of the adsorption product, the proportion of surface atropine to atropine adsorbed in the interstices of the resin becomes so great that much more than 50 percent of the atropine is eluted from the adsorption product in one hour, and the product is too toxic to be used in an amount sufficient to last eight to 12 hours or longer. In fact, the product is very little better than pure atropine sulphate, from the point of view of reduced toxicity.

The following table records the analytical data and the concentrations used to make atropine resin complexes together with the amounts of drug released by percolation of the complex with simulated gastric juice at the rate of 50 ml. per hour for three successive one hour periods. All studies were conducted on a minus 20 plus 40 mesh sulphonic acid cation exchange resin referred to herein as IR–120. In the table the percent composition column refers to the actual amount of drug as amine base present by direct quantitative assay.

TABLE IV.—ATROPINE

| Sample No. | Conc. of Atrop. SO₄ used, gm./l. | ml. used for 20 g. resin | Exposure Time, hr. | Percent Composition | Percent Released In— | | |
|---|---|---|---|---|---|---|---|
| | | | | | 1st Hr. | 2nd Hr. | 3rd Hr. |
| 77–15 | 5.41 | 100 | 1 | 1.60 | 87.0 | 10.5 | 1.0 |
| 77–27 | 5.41 | 400 | 1 | 3.95 | 48.5 | 13.2 | 11.5 |
| 77–28 | 5.41 | 400 | (¹) | 5.28 | 42.0 | 10.5 | 8.0 |

¹ Overnight.

In the preparation of suitable adsorption compounds the time of exposure of the drug base to the sulphonic acid cation exchange resin and the concentration of the drug are both important. If the time is too short, or the concentration is too low, unsatisfactory results, such as shown above for the 1.6 percent atropine, will be obtained. The following table shows suitable conditions of time and concentration for both atropine and amphetamine.

TABLE V

| Sample No. | Time of Reaction, Hr. | mg. Base Drug in Preparative Solution | mg. Base per ml. | Yield in gms. | Percent Drug in Complex | mg. Drug in Complex | Percent Drug Recov. in Complex |
|---|---|---|---|---|---|---|---|
| ATROPINE SULPHATE (83.3 PERCENT BASE) | | | | | | | |
| 77–46 | 1 | 1,250 | 12.5 | 19.9 | 3.24 | 744.8 | 59.6 |
| 77–47 | 6 | 1,250 | 12.5 | 19.8 | 3.19 | 631.6 | 50.5 |
| 77–48 | 1 | 3,832 | 383.2 | 22.3 | 11.0 | 2,453.0 | 64.0 |
| 77–49 | 6 | 3,832 | 383.2 | 22.0 | 12.5 | 2,750.0 | 72.0 |
| 55–13 | (¹) | 10,000 | 2,860.0 | 28.9 | 23.01 | 6,600.0 | 66.0 |
| AMPHETAMINE BASE | | | | | | | |
| 77–42 | 1 | 1,250 | 12.5 | 18.2 | 6.48 | 1,239.0 | 99 |
| 77–32 | 6 | 1,500 | 15.0 | 17.7 | 8.52 | 1,508.0 | 100 |
| 77–44 | 1 | 3,750 | 37.5 | 19.2 | 18.37 | 3,527.0 | 100 |
| 77–45 | 6 | 3,750 | 37.5 | 18.9 | 19.00 | 3,590.0 | 96 |
| 46–099 | (¹) | 13,000 | 130.0 | 30.8 | 40.50 | 12,474.0 | 96 |
| 37–090 | (¹) | (²) | | 30.0 | 39.77 | | |

¹ Overnight.
² Large excess.

The following table gives some elution data for both amphetamine and atropine. Sample 39–032 was not satisfactory for use in double dosage amount over that of amphetamine itself. The other samples were satisfactory for this purpose.

TABLE VI

| Drug | Lot No. | Mesh Size | Percent Comp. | Percent Released In Gastric Juice | | |
|---|---|---|---|---|---|---|
| | | | | 1st Hr. | 2nd Hr. | 3rd Hr. |
| dl-amphetamine | 37–090 | –20+40 | 39.77 | 32.7 | 17.0 | 7.6 |
| | 39–032 | +80 | 35.16 | 62.7 | 11.5 | 2.8 |
| Atropine | 55–13 | –20+40 | 23.01 | 33.3 | 19.9 | 13.8 |
| | 55–14 | +80 | 20.97 | 33.2 | 12.5 | 7.9 |

The types of drug which are suitable for use as adsorption compounds in this invention are organic compounds containing a basic nitrogen group and which in their base or common salt form have been orally administered to a patient for therapeutic purposes. They, of course, are absorbable in the gastro-intestinal tract, so that they get into the blood stream. Moreover, they should be biologically stable in hydrochloric acid, as set forth in column 4, lines 1–3. The invention is particularly advantageous for pharmaceutical, basic drugs which have a toxicity such that they cannot be administered to a patient in twice their normal or average dosage amount without deleterious side effects, and which must be administered more than once in 12 hours. Its great advantage nevertheless, as pointed out above, is with drugs which have an oral LD–50 in rats substantially less than that of most antibiotics, as for example amines and nitrogen heterocyclic compounds which in base form have an oral LD–50 in rats of less than 3000 m./kg. of rat. It can even be used for basic drugs having an LD–50 slightly lower than that of the most toxic orally administered drugs known, such as amines having an oral LD–50 of 50 mg./kg. of rat.

The broad class of compounds which can be adsorbed on sulphonic acid cation exchange resin and which by proper correlation of particle size and cross linkage and relative effectiveness of functional (basic) groups will be at least partially released in the gastro-intestinal tract are the organic compounds containing a basic nitrogen group in the molecule.

This broad class may be divided into the narrower categories, each of which has different elution and gastrointestinal release properties, requires different correlations of particle size and cross linkage, and may have other differences which will be pointed out as the following detailed description progresses.

The following classification outline is given for the purpose of aiding in an understanding of the breadth and variations of the invention:

I. Therapeutically effective organic compounds containing a basic nitrogen group:
- A. Organic amines in which an amine group is the sole basic nitrogen group.
  - (a) Adrenergic:
    - Amphetamine.
    - Ephedrine.
  - (b) Antihistamines:
    - Diphenhydramine.
    - Phenyltoloxamine.
  - (c) Antispasmodics:
    - Aminopentamide.
    - Tridihexethyl Iodide.
  - (d) Ataractics: Benactyzine hydrochloride.
  - (e) Antihypertensives:
    - Hexamethonium.
    - Pentamethonium.
- B. Organic compounds containing a heterocyclic nitrogen group.
  - (1) Organic compounds in which a heterocyclic nitrogen group is the sole basic nitrogen group.
    - (a) Alkaloids:
      - (aa) Phenanthrene opiates—
        - Morphine.
        - Codeine.
      - (bb) Benzylisoquinoline opiates—
        - Papaverine.
        - Ethaverine.
      - (cc) Solanaceae—
        - Atropine.
        - Scopolamine.
    - (b) Quaternary:
      - Methyl atropine.
      - Methyl scopolamine.
    - (c) Non-alkaloid:
      - (aa) Morpholines—phenmetrazine.
  - (2) Organic compounds containing basic nitrogen groups consisting of heterocyclic nitrogen groups and amine groups.
    - (a) Antihistamines:
      - Chlorpromazine.
      - Chlorpheniramine.
      - Pyrilamine.
    - (b) Urinary analgesic: 2,6-diamino-3-phenylazopyridine.

The sulphonic acid cation exchange resins which are suitable for obtaining the adsorption compounds of this invention are all of the known sulphonic acid cation exchange resins when used in the proper cross linkage and particle size, as herein set forth, and when reacted with drugs, as herein described.

The term "sulphonic acid cation exchange resin" is intended to include the phenol-sulphonic acid cation exchange resins and the carboxylic-sulphonic acid cation exchange resins, as well as the ordinary sulphonic acid cation exchange resins. However, particularly satisfactory results have been obtained with the sulphonic acid cation exchange resins disclosed in D'Alelio Patent No. 2,366,007, such resins being sulphonated polymerizates of polyvinyl aryl compounds. These are cross linked resins. Other suitable cross linked cation exchange resins are disclosed in U.S. Patents Nos. 2,204,539, 2,338,159, and 2,729,607.

An illustrated formula of a suitable cation exchange resin adsorption product of an amine, R' representing a resin nucleus, is:

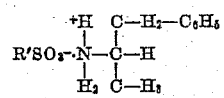

The above formula is for a sulphonic acid cation exchange resin having a cation of amphetamine adsorbed (ionically bound) thereon. It will be noted that the product is a compound, actually a resin salt obtained by the reaction of an acid (the sulphonic acid resin) with an alkali (the amine). The reaction may also be represented in simplified form, as follows:

where $R'SO_3^-$ represents the resin anion, A is the amphetamine as the free base, and $AH^+$ is the amphetamine cation.

The following Table VII shows the conditions present for the sulphonic acid resin adsorption compounds used to obtain the comparisons shown in Table VIII, and also gives the dosage range in milligram of drug base for eight to 14 hour effectiveness.

TABLE VII.—CONDITIONS PRESENT FOR AMINE AND HETEROCYCLIC NITROGEN SULPHONIC ACID RESIN SALT SHOWN IN TABLE V. (SOMETIMES DESIGNATED AS RESIN ADSORPTION COMPOUND OR RESIN SALT)

| Drug Base | Cross Linkage | Particle Size | Release in 1 Hr. in gastric juice | Dosage Range for 8–14 Hr. Effectiveness |
|---|---|---|---|---|
| Primary Amines: | | | | |
| α-methylphenethyl-amine (amphetamine) | (8–9) | (20–40) | 37.5 | 5–30 |
| phenyl tertiary butyl amine | (8–9) | (20–40) | 15.7 | 5–50 |
| Secondary Amines and Heterocyclic Nitrogen Compounds: | | | | |
| α-phenyl-α-hydroxy-B-methyl amino propane (ephedrine) | (8–9) | (20–40) | 27.1 | 15–100 |
| N¹α-dimethylphenethyl amine (desoxy ephedrine) | (8–9) | (20–40) | 27.8 | 5–30 |
| Mecamylamine (Inversine) | (8–9) | (20–40) | 26.8 | 5–30 |
| Methyl-α-phenyl-α-(2-piperidyl) acetate (Ritalin) | (8–9) | (20–40) | 31.8 | 10–30 |
| 3-methyl-2-phenyl-morpholine (phenmetrazine-Preludin) | (8–9) | (20–40) | 32.8 | 25–75 |
| Tertiary Amines and Heterocyclic Nitrogen Compounds: | | | | |
| 2[Benzyl (2-dimethyl-aminoethyl) amino] pyridine (Pyribenzamine) | (8–9) | (100–400) | 30.8 | 75–150 |
| 2[p-chloro-α-(2-dimethylamino ethyl) benzyl] pyridine (Chlor-Trimeton) | (8–9) | (100–400) | 29.8 | 5–15 |
| 2,6 diamino-3-phenylazopyridine (Pyridium) | (8–9) | (20–40) | 50.7 | 50–200 |
| 2[2-dimethylamino-ethyl) (p-methoxy benzyl) amino] pyridine (Pyrilamine) | (8–9) | (20–40) | 10.3 | 25–150 |
| N₁N-dimethyl-2(α-phenyl-o-toloxy) ethylamine (Phenyltoloxamine) | (8–9) | (100–400) | 9.9 | 25–150 |
| 10(3-dimethyl-aminopropyl) phenothiazine (Promazine) | (8–9) | (20–40) | | 100–500 |
| Codeine | (8–9) | (100–400) | 24.8 | 30–120 |
| Dihydrocodeine | (8–9) | (100–400) | 36.2 | 60–180 |
| Dihydrocodeinone | (8–9) | (100–400) | 12.4 | 1–10 |
| Metopon | (8–9) | (20–40) | 10.8 | 5–10 |
| Atropine | (8–9) | (20–40) | 33.3 | .5–2.0 |
| Dihydrohydroxy-codeinone | (8–9) | (100–400) | 31.8 | 5–25 |
| Scopolamine | (8–9) | (100–400) | 23.8 | 1.0–4.0 |
| α,α-diphenyl-γ-(dimethylamine) valeramide (Centrine) | (8–9) | (20–40) | 19.4 | .5–2.0 |
| 2-diethylamino ethylbenzilate (Benactyzine) | (8–9) | (20–40) | 28.2 | 5–20 |
| 2-chloro-10(3-dimethylaminopropyl) phenothiazine (Chlorpromazine) | (8–9) | (20–40) | 23.8 | 100–500 |
| Narcotine | (8–9) | (100–400) | 16.3 | 10–60 |
| 6,7 diethoxy-1-(3,4-diethoxy-benzyl) iso-quinoline (ethaverine) | (8–9) | (20–40) | 4.0 | 50–150 |
| Quaternary Amines and Nitrogen Heterocyclic Compounds: | | | | |
| 3-diethylamino-1-cyclohexyl-1-phenyl-1-propanol ethiodide (Pathilon) | (8–9) | (100–400) | 30.0 | 50–200 |
| 4,5,6,7 tetra chloro-2(2-dimethylamino ethyl) isoindoline dimethyl chloride (Ecolid) | (8–9) | (100–400) | 26.6 | 25–150 |
| Methyl Atropine | (8–9) | (100–400) | 56.6 | 3–10 |
| Methyl Scopolamine | (8–9) | (100–400) | 33.9 | 4–25 |
| Tricyclamol (Elorine) | (8–9) | (20–40) | 4.0 | 100–300 |

The following Table VIII shows a comparison of unit dosage amounts and average time of effectiveness of such amounts for drug common salts and the drug sulphonic acid resin salts shown in Table VII. The dosage amounts are above the average amounts in some cases.

than the amount of drug base in the maximum normal unit dose of the common salt or of the free base itself.

The term "minimum unit dose" of drug is herein defined as the minimum amount of drug base orally administered at one time to a patient in the form of the free

TABLE VIII

E* is Effectiveness of Common Salt.
E** is Effectiveness of Resin Salt

| Drug Base | Common Salt | Dose of Common Salt (mg. of base) | Dose of Resin Salt (mg. of base) | Period of E* Hours | Period of E** Hours | Use |
|---|---|---|---|---|---|---|
| Primary Amines: | | | | | | |
| α-methylphenethylamine (amphetamine) | Sulphate | 3.6 | 5.0 | 4 | 12 | Appetite Suppressant. |
| phenyl tertiary butyl amine | Hydrochloride. | 10.0 | 20.0 | 4 | 12 | Do. |
| Secondary Amines and Heterocyclic Nitrogen Compounds: | | | | | | |
| α-phenyl-α-hydroxy-B-Methyl amino propane (ephedrine). | Sulphate | 19.3 | 50 | 3 | 10 | Antiasthmatic. |
| $N_{1}α$-dimethylphenethyl amine (desoxy ephedrine). | Hydrochloride. | 2.6 | 5 | 6 | 12 | Appetite Suppressant. |
| Mecamylamine (Inversine) | do | 2.1 | 5 | 6 | 12 | Hypotensive. |
| Methyl-α-phenyl-α-(2-piperidyl) acetate (Ritalin). | do | 8.6 | 10 | 8 | 14 | Mood Elevator. |
| 3-methyl-2-phenylmorpholine (phenmetrazine-Preludin). | do | 20.7 | 25 | 10 | 14 | Appetite Suppressant. |
| Tertiary Amines and Heterocyclic Nitrogen Compounds: | | | | | | |
| 2[Benzyl (2-dimethylaminoethyl) amino] pyridine (pyribenzamine). | do | 43.8 | 75 | 6 | 12 | Antihistaminic. |
| 2[p-chloro-α(2-dimethylamino ethyl benzyl]pyridine (Chlor-Trimeton). | Maleate | 2.6 | 5 | 6 | 12 | Do. |
| 2,6 diamino-3-phenylazopyridine (Pyridium). | Hydrochloride. | 85.4 | 100 | 4 | 12 | Urinary Analgesic. |
| 2[2-dimethyl-amino ethyl (p-methoxy benzyl) amino]pyridine (Pyrilamine). | Maleate | (17.7–35.4) | 25–150 | 8 | 12 | Antihistaminic. |
| $N_1N$-dimethyl-2(α-phenyl-o-toloxy)ethylamine (Phenyltoloxamine). | Citrate | 28.7 | 25–150 | 6 | 12 | Do. |
| 10(3-dimethylaminopropyl) phenothiazine (Promazine). | Hydrochloride. | (21.7–86.6) | 25–150 | 6 | 12 | Tranquilizer. |
| Codine | Sulphate | (22.8–91.5) | 30–120 | 4 | 12 | Analgesic. |
| Dihydrocodeine | Bitartrate | 20–80 | 60–180 | 4 | 12 | Do. |
| Dihydrocodeinone | do | (3.1–7.3) | 5 | 4 | 12 | Antitussive. |
| Metopon | Hydrochloride. | 2.7 | 5–25 | 4 | 12 | Analgesic. |
| Atropine | Sulphate | (.22–.44) | .5–2.0 | 6 | 12 | Antispasmodic. |
| Dihydrohydroxy-codeinone | Hydrochloride. | 4.0 | 5–25 | 4 | 12 | Analgesic. |
| Scopolamine | Bromide | (.35–.7) | (1.0–4.0) | 4 | 12 | Antispasmodic. |
| α,α-diphenyl-γ-(dimethylamine) valeramide (Centrine). | Sulphate | .37 | .5–2.0 | 6 | 12 | Do. |
| 2-diethylamino ethyl-benzitate (Benactyzine). | Hydrochloride. | .9 | 5–20 | 6 | 12 | Tranquilizer. |
| 1-chloro-10(3-dimethyl-amino-propyl) phenothiazine (Chloropromazine). | do | (22.5–90) | (100–500) | 10 | 14 | Do. |
| Narcotine | Base | (15–30) | 25–60 | 6 | 12 | Antitussive. |
| 6,7 diethoxy-1-(3,4-diethoxy-benzyl) 150 quinoline (ethaverine). | do | 30 | 50–150 | 10 | 14 | Smooth Muscle-Relaxant. |
| Quaternary Amines and Nitrogen Heterocyclic Compounds: | | | | | | |
| 3-diethylamino-1-cyclohexyl-1-phenyl-1-propanol ethiodide (Pathilon). | Iodide | 17.9 | 50–200 | 4 | 12 | Antispasmodic. |
| 4,5,6,7, tetra chloro-2-(2-dimethyl amino ethyl)isoindoline dimethyl chloride (Ecolid). | Chloride | (8.3–83) | 25–150 | 8 | 16 | Hypotensive. |
| Methyl Atropine | Nitrate | .8 | 3–10 | 2 | 8 | Antispasmodic. |
| Methyl Scopolamine | do | 1.7 | 4–25 | 4 | 12 | Antisecretory. |
| Tricyclamol (Elorine) | Methyl sulphate. | (34.5–104) | (100–300) | 6 | 12 | Do. |

The dosage ranges set forth in the above Tables VII and VIII are the recommended ranges for the conditions given. They are also the recommended ranges for other suitable conditions of resin adsorption compounds such as those set forth in Tables II and III for resin adsorption compounds in which the drugs are eluted at not more than 50 percent of the total in one hour of elution with simulated gastric juice.

It will be seen that these dosage ranges vary enormously with different amines and heterocyclic nitrogen compounds, from .2 mg. to 2000 mg., but the general preferred common feature is that the minimum unit dosage amount of the drug base in the adsorption compound is substantially greater than the average unit dose of the drug base or the common salt, such as the hydrochloride or phosphate, and can be at least twice that of the average unit dosage amount for these common compounds. The amount of drug base in a unit dose of the resin adsorption compound of this invention can be, and generally is, in order to obtain long lasting effect, substantially greater base or the common salt which is therapeutically effective as determined by clinical tests on a representative group of adult patients, and then taking the average therapeutic amount per patient.

The term "maximum normal unit dose" is herein defined as the maximum amount of drug base orally administered at one time to a patient in the form of the free base or the common salt which is therapeutically effective without substantial untoward side effects (nontoxic), as determined by clinical tests on a representative group of patients, and then taking the average determined amount per patient. For the purpose of this application, the minimum unit dose and the maximum normal unit dose are respectively the minimum and maximum unit dosage amounts accepted by or acceptable to the U.S. Food and Drug Administration. The term "average unit dose" or "optimum unit dose" is the average of the minimum unit dose and the maximum normal unit dose. The dosage amounts can also be obtained by taking the minimum and maximum dosage amounts for the drug given in various medical books and converting the amount, if necessary, to free base; see particularly the Physician's Desk Reference, published by Medical Economics, Inc. Where only one amount is given, this amount is the "average amount" unless otherwise indicated.

The dosage unit compositions of this invention can contain other ingredients besides the sulphonic acid resin adsorption compounds. The adsorption compound itself in general will not have more than 50 percent of bound drug, even when saturated. The remainder of the resin adsorption compound acts as a diluent and a carrier, and has been found to have no harmful effect on the system when used in dosage amounts below 2000 mg. of drug base. Indeed, it has been found that more than about 2000 mg. of unreacted sulphonic acid cation exchange resins may be mixed with the amine or nitrogen heterocyclic compound reacted resin without deleterious effect in the metal ion balance of the body. Other completely pharmaceutical innocuous carriers can be used in the dosage composition, such as methyl cellulose, carboxymethyl cellulose, clay, and the like. Also, various antacids may be added. In general, the amount of carrier and other added material should be such that the amount of drug as drug base in a dosage unit is not less than approximately two percent by weight. Amounts of drug base of 60 and 70 percent and higher are suitable.

The dosage unit composition can contain unadsorbed or free drug, but in general this is not advisable since it increases the initial peak effect. The amount of unadsorbed or free drug having substantially the same oral LD–50 in rats as the adsorbed drug should preferably be below 50 percent of the bound drug. And, for the best results, the total of such free drug and the drug released by the simulated gastric juice from the adsorption compound in one hour should not be more than 50 percent, such as 90 percent of the total drug content. Even with the relatively toxic amines and heterocyclic nitrogen compounds, higher amounts than 50 percent can be used because there is still obtained a substantial reduction in the peak effect over that using pure unadsorbed amine or other basic drug.

It will be seen from the above Tables VII and VIII that the unit dose for the resin salt is substantially more than that of the unit dose of the common salt and the period of effectiveness is also substantially more. Just as important as the fact the period of effectiveness is substantially greater is the fact (not shown in the table) that the toxicity and deleterious side effects have not increased. Animal tests and clinical tests show that when less than 50 percent of the above amines and nitrogen heterocyclic compounds are eluted in one hour by .07 N HCl with .03 N NaCl from the resin adsorption compound, the average unit dose can be at least doubled and the oral LD–50 in rats is more than doubled.

The following Table IX shows a comparison of the toxic (LD–50) dose of drugs in both the free and resin complex form. When the drug release is retarded, a greater amount of drug can be administered without making available at any one time a sufficient amount of free drug to cause death.

In Table IX the resin is the sulphonic acid cation exchange resin having a cross linkage of eight to nine percent (IR–120 or XE–69) with the particle size as designated. The oral LD–50 in rats is in milligrams of base per kilogram weight of the rat. The elution process to determine drug release in one hour was the percolation process described in column 41, lines 3–29.

TABLE IX

| Drug | Particle Size | Percent On Resin | Oral LD–50 (Rats) | Ratio Complex To Salt | Percent Released In 1 Hr. | Percent Remaining In Matrix After 1 Hr. |
|---|---|---|---|---|---|---|
| dl-Amphetamine Phosphate | | | 175 | | | |
| dl-Amphetamine | −80+400 | 32.6 | 195 | 1.11 | 64.6 | 35.4 |
| dl-Amphetamine | −20+40 | 39.8 | 395 | 2.26 | 37.5 | 62.5 |
| Atropine Sulphate | | | 790 | | | |
| Atropine | −80+400 | 21.0 | 2,200 | 2.8 | 33.33 | 66.7 |
| Atropine | −20+40 | 23.0 | >3,000 | >3.8 | 33.2 | 66.8 |
| Ephedrine Sulphate | | | 600 | | | |
| Ephedrine | −80+400 | 37.0 | 960 | 1.6 | 82.3 | 17.7 |
| Ephedrine | −20+40 | 34.01 | | | 27.1 | 72.9 |
| Methyl Scopolamine Nitrate | | | 1,560 | | | |
| Methyl Scopolamine | −20+40 | 26.25 | 3,200 | 2.1 | 15.3 | 84.7 |
| Dihydrocodeinone Bitartrate | | | 250 | | | |
| Dihydrocodeinone | −80+400 | 19.2 | 1,200 | 4.8 | 12.4 | 87.6 |
| Phenyltoloxamine Citrate | | | 840 | | | |
| Phenyltoloxamine | −80+400 | 45.1 | 730 | .87 | 9.3 | 90.7 |
| Phenyltoloxamine | −20+40 | 44.55 | 2,500 | 3.0 | 4.1 | 95.9 |

In order to reduce the LD–50 by means of a resin-complex formation by a factor of two (and thus be able to administer at least twice the average dose of drug in its common form) it is necessary to have a substantial proportion of the total drug content held in the matrix and unavailable for release at physiological cation concentrations within a period as long as one hour. This condition is met when not more than 50 percent of the drug is eluted with simulated gastric juice in one hour. The elution may be by batch immersion of the resin in an excess of simulated gastric juice so that the acid concentration remains substantially constant or by percolation with simulated gastric juice. Preferably, also, the sulphonic acid resin should be saturated or within 50 percent of saturation as the first reaction tends to be close to the surface of the resin.

Clinically, the toxicity data shown in Table IX has been substantiated wherever tested. Amphetamine resin complex in the −20+40 mesh size of 8 to 9 percent cross linkage is commercially successful as a 12-hour appetite suppressant. The >80 mesh size of this drug in this cross linkage is unsatisfactory for this use in that it releases the drug too rapidly and undesirable side effects are observed. However, at 15 percent cross linkage satisfactory results are obtained. Ephedrine in the >80 mesh size likewise release the drug too quickly. The −20+40 mesh resin complex of this drug is satisfactory. Methyl scopolamine on −20+40 mesh has been successfully used on patients at 25 to 35 mgm. in a single dose. This is three to eight times the normal non-resinated single dose.

In an effort to determine the effect of other factors than particle size and cross linkage on the release of drugs from sulphonic acid resin complexes having small amounts of bound drug. In general while it is preferable to have the resin complex saturated with the drug, satisfactory results can be obtained with much lower amounts than saturation, even down to five percent of saturation and lower with most drugs. The amphetamine sulphonic acid resin complex, for example, was suitable when only 1.76 percent of the amphetamine was bound to the resin. And, it was also satisfactory when the resin was substantially saturated with amphetamine to the extent of 40.7 percent. Atropine on the other hand when adsorbed on a coarse mesh sulphonic acid cation exchange resin in a concentration of 1.6 percent was unsatisfactory and it was apparent that at this concentration practically all of the atropine was on the surface of the resin where it would be quickly eluted by the gastric juice. However, by increasing the concentration of bound atropine by using excesses of atropine with the sulphonic acid resin and giving a time of contact of several hours, a suitable compound could be obtained which would have a slow release by the gastric juice throughout the time the product was in the stomach and which could be used in twice the normal dosage amount for atropine sulphate.

In summary, the conditions necessary to obtain an adsorption drug compound whose drug will not be completely released during the period of time that the adsorption compound is in the stomach vary greatly and are quite critical. The conditions of cross linkage, particle size, and minimum percent adsorption have been set forth above for various drugs reacted with sulphonic acid cation exchange resins. The principles set forth above and the disclosure of suitable elution tests teach how to prepare suitable amine and nitrogen heterocyclic sulphonic acid adsorption compounds than those specifically disclosed. And, the dosage ranges for such compounds can also be readily established from a knowledge of the conditions set forth above for disclosed drugs accompanied, if desired, by simple non-inventive check procedures.

The following procedures for preparing specific adsorption compounds, tests on such compounds, and the preparation of capsules, tablets, and syrups in suitable dosage amounts are intended to be illustrative and not to limit the invention to any of the specific details.

In the examples given and elsewhere in the specification, the sulphonic acid cation exchange resins are often designated by some term such as IR-120, Amberlite IR-120, XE-69 and the like. These designations are trade names but, rather than rely upon the name itself and whatever information be obtained from the manufacturer or in the published literature, the products are identified in this specification as follows:

IR-120: A water insoluble sulphonated polymerizate of polyvinyl aryl compound made in accordance with Example One of United States Patent No. 2,663,007 except that 7.5 parts by weight of divinyl benzene are used instead of the 10 parts. The particle size is such that approximately 90 percent of the particles are retained on a 40 mesh screen, 5.67 percent on a 20 mesh screen, and 3.33 percent on a 60 mesh screen. The product can be considered as substantially consisting of particle size of between 20 and 40 mesh. The cross linkage is between 7 percent and 8 percent.

XE-69: The same as IR-120 except that substantially all particles pass through an 80 mesh screen and are retained on a 400 mesh screen.

Example 1

To 370 grams of moist Amberlite IR-120 resin (225 grams of dry resin) suspended in distilled water was added an amount of amphetamine base sufficient to yield a product containing approximately 40 percent $dl$-amphetamine base. The mixture was stirred for two hours and dried for 15 hours at 60° C. The $dl$ resin complex was found to contain 41.0 percent $dl$-amphetamine. The screen analysis was essentially the same as that indicated for the resin uncombined.

The screen analysis is given in Table X.

TABLE X

| Screen Size | Percent Retained | |
| --- | --- | --- |
| | IR-120 | Amphetamine Resin Complex |
| #20 | 5.67 | 5.36 |
| #40 | 90.00 | 89.67 |
| #60 | 3.33 | 3.67 |

The $d$-resin complex was made following the same procedure as described for the $dl$ resin complex above. The $dl$-amphetamine content was 44 percent and the screen analysis was essentially the same as that for both the $dl$ complex and the unreacted resin.

Equal portions of the $dl$-resin complex and the $d$-resin complex were mixed to yield a product having the preferred ratio $1:3::l:d$ amphetamines.

The product was then subjected to gastric and intestinal tests. Table XI gives the result of the gastric test using simulated gastric juice at 37° C.

TABLE XI

| Time of Exposure, hr. | Percent Bound Amphetamine Released In Indicated Volume | |
| --- | --- | --- |
| | 25 ml. | 50 ml. |
| 1 | 17.497 / 17.505 | 22.04 / 19.07 |
| 2 | 18.57 / 22.91 | 31.904 / 28.497 |
| 4 | 30.73 / 32.29 | 35.35 / 33.96 |

The following table gives the results of the intestinal tests using simulated intestinal juice. The simulated intestinal juice was allowed to drip over the amphetamine complex at a flow rate of 15 ml. per hour. The table shows the percentage of bound amphetamine released during the time interval indicated.

TABLE XII.—PERCENT BOUND AMPHETAMINE RECOVERED FROM ELUENT

| Time of exposure: | Percent |
| --- | --- |
| 1 hr. | 20.89 |
| 2 hr. | 12.74 |
| 3 hr. | 10.06 |
| 4 hr. | 9.18 |

On the basis of the laboratory tests shown above, the product was filled into capsules, each capsule containing 20 mg. of amphetamine (as the $1:3::l:d$ amphetamine resin complexes). Patients were given single capsules as a daily dose. Clinical results show that the capsules were effective in suppressing appetite and inducing mood amelioration over approximately a 12 hour period, and when taken by the patient in the morning, the individual did not require further medication until the following morning. The single dose of 20 mg. base as the resin complex administered in the morning appeared to be substantially superior to 10 mg. dosages of the phosphate four times daily and gives less in the way of untoward reactions such as physiologic overstimulation and insomnia. The product may also be administered in tablet form.

Following are typical manufacturing procedures for the manufacture of amphetamine resin complexes and capsules containing such complexes:

THE MANUFACTURE OF d-AMPHETAMINE-RESIN-COMPLEX

To 100 lbs. of Amberlite IR–120, 40 gallons of water is added. During agitation, 33.06 lbs. d-amphetamine is added slowly to the slurry. After the addition of the d-amphetamine, the complex is agitated for an additional three hours and is then washed to neutrality. The product is then spread thin and dried at 110° F.

THE MANUFACTURE OF dl-AMPHETAMINE-RESIN-COMPLEX

To 100 lbs. of Amberlite IR–120, 40 gallons of water is added. During agitation, 33.06 lbs. dl-amphetamine is added slowly to the slurry. After the addition of the dl-amphetamine, the complex is agitated for an additional three hours and is then washed to neutrality. The product is then spread thin and dried at 110° F.

MANUFACTURING PROCEDURE FOR BIPHETAMINE-RESIN-COMPLEX CAPSULES CONTAINING 12.5 MG. OF AMPHETAMINE BASE

Transfer 494 lbs., 13 ozs., and 315 grains of dicalcium phosphate to a mixer, and add 5 lbs., 9 ozs., and 67 grains of animal charcoal and mix for ½ hour. Then add 5 lbs., 9 ozs., and 67 grains of magnesium stearate by screening through 40 mesh screen and mix for an additional hour. Transfer material to a mixer and add 25 lbs., 6 ozs., and 328 grains of dl-amphetamine as the resin complex and 25 lbs., 12 ozs., and 247 grains of d-amphetamine as the resin complex (40.0 percent amphetamine) and mix for four hours, take sample and continue mixing for one and ½ hours. Capsulate in black and white capsules.

SUMMARY TO AMPHETAMINE AND OTHER ADRENERGIC AMINE SULPHONIC ACID RESIN COMPLEXES

The particle size can vary to almost any extent depending upon the cross linkage, satisfactory results having been obtained with complexes having particle sizes varying from 10 mesh to 400 mesh with cross linkage of 17 percent to one percent. With a cross linked resin acid complex of 8–9 percent, a suitable composition for the majority of the particles of the complex between 10–50 mesh; and preferably 80 percent within that range since 20 percent of finer such as 200 mesh is nearly equivalent to adding a pure unadsorbed compound such as amphetamine sulphate or phosphate. With a cross linked resin of approximately 15 percent the particle size can be 100 mesh or finer up to about 400 mesh, thus allowing the practical use of the amphetamine as an aqueous suspension, the coarse 40 mesh beads not making a satisfactory suspension due to their size.

The unit dosage amount for suitable resin adsorption compounds can vary rather widely but preferably is at least twice the average amount for the common amphetamine salt. (Unit dosage amounts are always in this specification calculated as amine base in order to have a common basis for comparison.) For example, 20 mg. of amphetamine as the resin complex is approximately equivalent to 32 mg. of amphetamine phosphate and nearly 60 mg. of amphetamine sulphate. The short acting, quickly adsorbed common salt form of the drug is always given at a substantially lower dose than is the amphetamine sulphonic acid resin complex. The resin complex containing 12.5 mg. of amphetamine will be effective for 12 hours, whereas the 5 mg. amphetamine phosphate (2.9 mg. of amphetamine) will only last 4 hours.

The minimum dosage amount of amphetamine sulphonic acid resin complex for an eight hour or longer effect is approximately 5 mg. The maximum unit dose is about 40 mg. for appetite suppression but can be as high as 60 mg. when used as a stimulant. Even at 40 mg. with the resin complex the side effects are no worse than 10 mg. of amphetamine as the amphetamine phosphate or sulphate.

In place of amphetamine, other appetite suppressants may be used to form sulphonic acid resin adsorption compounds or complexes.

My co-pending application S.N. 527,130, filed August 8, 1955, discloses methamphetamine alpha-methylphenethylmethyl amine) as well as amphetamine (alpha-methylphenethyl amine) and like substituted amphetamines.

The following example shows the preparation of d-methamphetamine resin complex:

Example 2

Twenty-five grams dried IR–120 (H+) resin suspended in 70 mls. H₂O and stirred 30 minutes. 20.0 gms. d-methamphetamine was added with stirring and stirring continued for three hours. No detectable heat was evolved during the reaction. On completion of stirring, the supernatant was essentially clear although the odor of methamphetamine was present. The resin complex was washed with successive one-liter portions of distilled water on a sintered glass filter until the pH of the filtrate was neutral. The resin complex was then dried in a 60° C. oven.

The percentage composition of the resin complex was 41.61 percent of methamphetamine.

The sulphonic acid complex of methamphetamine can be used in dosage amounts from approximately 5 mg. to 50 mg. of amine base in the complex for eight to 14 hours' appetite suppression.

Another suitable resin complex can be made by reacting IR–120 with Preludin (3-phenyl-3 methyl morpholine). This resin adsorption compound can also be used as an appetite suppressant at a recommended dosage of twice the average dose for the amine base as the phosphate.

Another adrenergic amine which can be used as the resin complex at twice its average common salt or amine base dosage in a single dose is propadrine. A satisfactory dosage range is 75 mg. to 200 mg. with an optimum dose of 100 mg.

The adrenergic amines can all be reacted with sulphonic acid cation exchange resins to give adsorption compounds which can be orally administered to a patient in at least twice the normal dosage amount for the common salt for the purpose of eight hour or longer effectiveness for the treatment of the conditions for which the common salt is used. A sulphonic acid resin having a particle size of 10 to 50 mesh and cross linkage of 8–9 percent is suitable for all these adrenergic amines but as shown above finer particle size, such as 100 mesh, is suitable when the cross linkage is increased to, for example, 15 percent.

Many of the adrenergic amines chemically combined with sulphonic acid cation resins are suitable for the treatment of depressive states and also for the treatment of asthmatic conditions. The sulphonic acid resin adsorption compounds of propadrine and ephedrine are suitable for oral administration in the treatment of asthma.

Example 3

To 96.3 mg. of moist Amberlite IR–120 resin (25.0 grams of dry resin) suspended in distilled water was added 25.0 grams of ephedrine sulphate. The mixture was stirred for six hours, washed with water and dried for fifteen hours at 60° C. The resin complex was found to contain 34.01 percent ephedrine adsorbed thereon as ephedrine cation. The screen analysis, as shown in Table XIII, was essentially the same as that indicated for the resin uncombined.

TABLE XIII

| Screen Size | Percent Retained IR-120 | Ephedrine Resin Complex, Percent |
|---|---|---|
| #20 | 4 | Already screened out before complexing. |
| #40 | 94 | 97. |
| #60 | 2 | 3. |

The product of Example 3 was then subjected to simulated gastric and intestinal juice elution tests. Table XIV gives the result of the gastric test eluting with simulated gastric juice (as an artificial gastric medium).

TABLE XIV.—PERCENT BOUND EPHEDRINE RELEASED

Time of exposure: Percent
1 hr. _____ 27.1
2 hrs. _____ 19.8
3 hrs. _____ 11.8

Total _____ 58.7

The following table gives the results of the intestinal tests using simulated intestinal juice after the resin was exposed to simulated gastric juice, as shown in Table XIV. The simulated intestinal juice was allowed to drip over the ephedrine complex at a flow rate of 5 ml. per hour. The table shows the percentage of bound ephedrine released during the time interval indicated.

TABLE XV.—PERCENT BOUND EPHEDRINE RECOVERED FROM ELUATE

Time of exposure: Percent
1 hr. _____ 7.5
2 hrs. _____ 4.7
3 hrs. _____ 1.6

Total _____ 13.8

The total ephedrine eluted by the gastric and intestinal juices in the above tests was 72.5 percent of the original amount on the resin.

The adsorption product of Example 3 was substantially saturated with ionically bound ephedrine as the ephedrine cation. This was likewise true for propadrine.

The partially saturated adsorption products of ephedrine or propadrine with sulphonic acid cation exchange resins were made by following the procedure of Example 3 except that the amount of ephedrine or propadrine adsorbed on the base was regulated by regulating the amount of ephedrine or propadrine contacted with the resin.

The following example shows the preparation of a sulphonic acid cation exchange resin complex of ephedrine which is approximately 75 percent saturated with ephedrine base:

*Example 4*

The sulphonic acid cation exchange resin IR-120 having a particle size such that substantially all the particles are retained by a 40 mesh sieve but pass through a 5 mesh sieve, the particles being of round bead shape, was suspended in water in the proportion of 25 grams of the dry IR-120 resin in 200 ml. of water. 12.0 grams of ephedrine sulphate was added and the mixture stirred for approximately one hour and 30 minutes, filtered, washed copiously with water and dried at approximately 50° C. overnight. The yield was 32.5 grams and the assay was 25.4% by weight ephedrine corresponding to approximately 75% saturation. The adsorption compound obtained by this process was in smooth bead form and was screened to a particle size of −20 to +40 mesh.

The following Table XVI gives the elution data for various amounts of ephedrine adsorbed on sulphonic acid cation exchange resins:

TABLE XVI.—EPHEDRINE RESIN COMPLEXES ELUTION DATA

| Type Resin | Percent Ephedrine Adsorbed | Gastric Juice | | | Intestinal Juice | | | Total Percent |
|---|---|---|---|---|---|---|---|---|
| | | 1st Hr. | 2nd Hr. | 3rd Hr. | 1st Hr. | 2nd Hr. | 3rd Hr. | |
| XE-69 | 40.13 | 83.39 | 6.24 | 1.25 | .5 | | | 91.38 |
| IR-120 | 34.08 | 46.2 | 10.0 | 10.9 | 8.5 | 4.2 | 2.7 | 82.5 |
| IR-120 | 34.15 | 37.6 | 14.5 | 8.4 | 5.1 | 1.5 | .7 | 67.8 |
| IR-120 | 34.01 | 27.1 | 19.8 | 11.8 | 7.5 | 4.7 | 1.6 | 72.5 |
| IR-120 | 25.4 | 31.9 | 17.2 | 12.8 | 8.0 | 3.8 | 2.5 | 76.2 |
| IR-120 | 18.3 | 17.5 | 17.5 | 11.0 | 4.0 | 6.2 | 3.0 | 59.2 |
| IR-120 | 18.5 | 18.8 | 18.3 | 11.3 | 5.6 | 4.3 | 2.0 | 60.3 |
| IR-120 | 11.0 | 6.3 | 15.0 | 11.5 | 6.3 | 8.3 | 4.3 | 51.7 |
| IR-120 | 10.05 | 12.0 | 12.0 | 11.3 | 7.0 | 9.5 | 8.5 | 60.3 |
| IR-120 | 9.86 | 12.0 | 12.5 | 9.0 | 4.0 | 6.8 | 8.0 | 52.3 |
| IR-120 | 9.63 | 11.0 | 12.9 | 10.3 | 5.5 | 10.5 | 7.3 | 57.5 |

It will be seen from the above table that with XE-69 resin, which is a fine particle size sulphonic acid cation exchange resin, that the ephedrine is nearly 90 percent eluted by the gastric juice in the first hour. This resin complex is thus only slightly better than ephedrine sulphate or ephedrine chloride which has not been adsorbed on the cation exchange resin. On the other hand, the ephedrine resin complex made by adsorbing the ephedrine cation on the relatively coarse IR-120 resin is slowly eluted by gastric and intestinal juices over a six hour period and thus is substantially superior to the unadsorbed ephedrine sulphate or chloride. The table also shows that with the saturated complex the amount eluted by the gastric juice in the first hour is much higher than that eluted in the second and third hours. It has been found that in order to substantially decrease this high first hour elution the resin complex should be partially saturated, preferably below 75 percent ephedrine cation adsorbed. The same results hold for propadrine resin complexes as well.

On the basis of the laboratory tests shown above, the ephedrine and propadrine adsorption compounds made from IR-120 resin and of −20 to +40 particle size were filled into capsules, each capsule containing 50 mg. of ephedrine or propadrine calculated as the cation. Patients were given single capsules as a daily dose. Clinical results show that the capsules were effective in alleviating asthma over approximately a 12 hour period, and when taken by the patient in the morning, the individual did not require further medication until evening. The single dose of 50 mg. administered in the morning appeared to be substantially superior to 25–50 mg. dosages of ephedrine or propadrine sulphates three to four times daily and gave less in the way of untoward reactions such as physiologic over stimulation, insomnia and a rise in blood pressure. It thus appeared that the ephedrine and propadrine in the form of the resin adsorption compound having a particle size of −20 to +40 mesh and a cross-linkage of 3–17 percent is more potent in the alleviation of asthma than a greater amount of the ephedrine and propadrine in the form of a sulphate, as well as having a less toxic effect.

The dosage unit for the treatment of bronchial asthma for the sulphonic acid ephedrine or propadrine resin compounds of this invention is a minimum of approximately 10 milligrams of the composition on the basis of the ephedrine or propadrine cation adsorbed. The maximum dosage unit in order to avoid deleterious side effects is approximately 300 milligrams on the basis of the ephedrine or propadrine base adsorbed. The adsorption compound alone or mixed with pharmaceutically acceptable carriers is suitably given to the patient for the treatment of asthma in 25 to 300 milligrams and generally 25 to 50 mg. amounts (on the basis of the ephedrine base) once every 12 hours. Compare this with the normal dosage of 25–50 milligrams of ephedrine sulphate or propadrine sulphate administered three to four times a day.

The following table shows toxicity data for ephedrine sulphate and for the XE-69 saturated (37.2%) adsorption compound of ephedrine sulphate; the IR-120 saturated (34.1%) and the IR-120 complexes at 18.0 percent and 10.0 percent:

TABLE XVII

| Compound | Anion | Percent Base | Animal | LD-50 (mg. of base per kg. of animal) | Confidence Limits 19/20, mg./kg. | LD-50 Ratio Complex to Salt |
|---|---|---|---|---|---|---|
| Ephedrine | Sulphate | 77.1 | Rats | 600 | 451-798 | |
| Do | XE-69 | 37.2 | do | 960 | 776-1,110 | 1.6 |
| Do | IR-120 | 18.0 | do | 1,560 | 1,190-2,040 | 2.6 |
| Do | IR-120 | 10.0 | do | 1,430 | 1,170-1,750 | 2.4 |
| Do | IR-120 | 34.1 | do | 1,120 | 1,010-1,530 | 1.9 |

The toxicity tests were confirmed by blood pressure tests on dogs. In paired dogs, 5 mg. of ephedrine resin complex at the maximum point of response gives the same blood pressure effect as does 2 mg. of ephedrine as the sulphate. 2 mg. of the resin complex gives slightly less maximum blood pressure effect than does one mg. of the sulphate.

The resin complexes of this invention can be used as such or they can be mixed with other pharmaceutically compatible ingredients or excipients. For example, it may be desired to give the complex in capsules, pills, tablets, or as a powder, or even in syrups, elixirs, or emulsions. The resin complex can be intermixed with flavoring and coloring materials, clay, bentonite, antacids such as hydrated magnesium trisilicate, bismuth suboxide, zirconium subcarbonates, sodium alginate, emollients such as methyl cellulose, gastric mucin, carboxymethyl cellulose, and the like, or with naturally occurring gums and mucilages, gelatin amino acids and their salts, peptones, peptides, or with any other ingredients cooperative therewith and not incompatible therewith. The concentrate can vary from 100 percent resin complex (about 30 percent ephedrine or propadrine base) to 0.1 percent by weight (ephedrine or propadrine base) and lower with the physiologically innocuous carrier.

The antihistaminic amines and nitrogen heterocyclic compounds are particularly suitable to compound with sulphonic acid cation exchange resins since these compounds in the form of their common salts have such deleterious side effects that they must be orally administered in unit dosage amounts which are effective only four hours or less, and in order to maintain the effect they are given generally before or after each meal. All of the antihistaminic nitrogen compounds when chemically combined with a sulphonic acid cation exchange resin (following the principles of particle size and cross linkage explained above) can be given in a unit dose containing at least twice the average dose of drug base as is in the common antihistaminic salt, having an oral LD-50 in rats of at least twice the common salt, and are effective eight hours or longer.

All basic nitrogen containing antihistaminic agents can be reacted with sulphonic acid cation exchange resin to obtain pharmaceutical preparations which have 10 hour or greater sustained effectiveness without deleterious side effects. Suitable compounds have the general formula: R—X—C—C—N where X is nitrogen, oxygen or carbon connecting the side chain to the nucleus. Generally the nucleus must have a minimum of two aryl or aralkyl groups (or equivalent in a polycyclic ring system). Suitable specific antihistamines for use in this invention are all those disclosed in chapter 41, pages 12 and 13, of Pharmacology in Medicine by Victor A. Drill. The Table 41-1 is incorporated in this application by reference.

The sulphonic acid resin adsorption compound chemically combined with the antihistamines of Table 41-1 of the above reference can be used in the same manner as the unadsorbed compounds in two to four times the average unit dose (on the basis of the antihistaminic base).

Particularly satisfactory results are obtained with the salts of sulphonic acid cation exchange resins and antihistaminic bases having the formula:

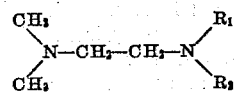

wherein $R_1$ is the α-pyridyl group

and $R_2$ is the benzyl group.

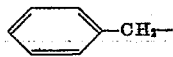

a substituted benzyl group or one of the isosteres of the benzyl group, such compounds including pyrilamine (Neo-Antergan), methapyrilene (Histadyl), chlorothen (Tagathen), thenyldiamine (Thenfadil), thonzylamine (Neohetramine) and methafurylene (Foralamin). Highly satisfactory cation exchange resins are the water insoluble sulphonated polymerizates of poly vinyl aryl compounds such as those disclosed in the D'Alelio Patent No. 2,366,007. Especially satisfactory results from the point of view of sustained release have been obtained by reacting an antihistaminic base with a water insoluble sulphonated polymerizate of a mixture comprising divinyl benzene and styrene, the polymerizate being cross-linked to the extent of about 7-8 percent, and the final resin salt having a particle size of between approximately 10 and 80 mesh.

An illustrated formula of a suitable cation exchange resin salt of an antihistaminic base is given below, A representing a resin nucleus:

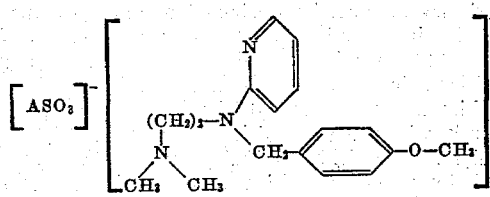

The following examples will illustrate the invention. In these examples the term XE-100 is a sulphonic acid cation exchanger having a 4-5 percent cross linked polyvinyl-styrene nucleus; the term IR-120 is used to represent the sulphonic acid cation exchange resin of Example 1, of Patent No. 2,366,007; XE-69 is the same as IR-120 but more than 80 mesh; Dowex 16-50 is the sulphonic acid cation exchange resin identified as Dowex-50 in Industrial Engineering Chemistry, vol. 40, pp. 1351-1355, and in U.S. Patent No. 2,366,007, and may be used in place of IR-120.

*Example 4a.—Pyrilamine resin salt*

To 20 gms. of dried IR-120 resin suspended in about 600 mls. of distilled water, slowly add pyrilamine base with stirring. The initial pyrilamine addition caused heat production and particles of resin to agglomerate as a heavy mass, and hence render stirring inefficient. Further addition of the same caused no increase in agglomeration although progressive removal of the base from the suspension was evident until saturation which appeared to occur at about 15 mls. grossly. The addition covered about three days with continued stirring. By analysis, the complex contained 47.9 percent pyrilamine base. The dissociation properties will be found in Summary 1.

*Example 5.—Pyrilamine resin salt*

20 gms. of wet XE-100 mixed with water and 10 gms. of pyrilamine were mixed with 5 percent surfactant aqueous solution (polysorbate 80) until a good dispersion resulted. The pyrilamine solution was added with stirring, slowly to the resin. It was stirred for approximately 2 hours, filtered, washed with water, and oven dried. By analysis, the complex contained 9.5 percent pyrilamine base. The dissociation properties of this produce are shown in Summary 2.

*Example 6.—Pyrilamine on XE-69*

To 20 grams of XE-69 in the hydrogen phase suspended in 100 ml. of water and 20 ml. of methyl alcohol solvent are added 20 cc. of pyrilamine base. The mixture is stirred for two hours, filtered and the solid washed by suspension in 200 ml. of water and filtered. This washing by suspension is repeated three times. The resulting complex is dried in the oven at 58° C.

*Example 7.—Pyribenzamine on XE-69*

To 10 grams of XE-69 in the hydrogen phase suspended in 50 ml. of water are added the base obtained from 20 gms. of pyribenzamine hydrochloride. The mixture was allowed to stand over the weekend, was filtered and washed by resuspending the solid in 200 ml. of water. After filtration, the solid was washed once with 30 percent aqueous acetone filtered and dried in the 58° C. oven overnight.

In the following summaries the eluent used is the same as that described in the U.S. Pharmacopoeia, vol. XV, pp. 1094-1095, except for the omission of enzymes.

SUMMARY 1
(For Example 4a)

Drug: Pyrilamine. Complexing agent: IR-120.
Experimental results: Sample size 1.5 gm. Equivalent to 718.9 mgm. of pyrilamine.

| Sample No. | Eluent Used | Collected, cc. | Time, min. | Kjeldahl $N_2$, mg. | Percent Eluted |
|---|---|---|---|---|---|
| 1 | Art. Gastric Juice. | 50 | 60 | 78.07 | 10.86 |
| 2 | do | 50 | 60 | 26.31 | 3.66 |
| 3 | do | 50 | 60 | 28.26 | 3.93 |
| 4 | Art. Intestinal Juice. | 50 | 90 | 11.03 | 1.53 |
| 5 | do | 50 | 60 | 14.85 | 2.06 |
| 6 | do | 50 | 25 | 6.79 | 0.94 |

Percent eluted by acid, 18.45% in 3 hours.
Percent eluted by base, 4.53% in 2 hours, 55 min.
Percentage total eluted, 22.98% over 5 hours, 55 min.

SUMMARY 2
(For Example 5)

Drug: Pyrilamine. Complexing agent: XE-100.
Experimental results: Sample size 1.5 gm. Equivalent to 142.5 mgm. of pyrilamine.

| Sample No. | Eluent Used | Volume Collected, cc. | Time, min. | Kjeldahl $N_2$, mg. | Percent Eluted |
|---|---|---|---|---|---|
| 1 | Art. Gastric Juice. | 50 | 60 | 7.6 | 5.3 |
| 2 | do | 50 | 30 | | |
| 3 | do | 50 | 60 | | |
| 4 | Art. Intestinal Juice. | 50 | 70 | 7.2 | 5.1 |
| 5 | do | 50 | 50 | | |
| 6 | do | 50 | 75 | | |

Percent eluted by acid, 5.3% in 2 hrs., 30 min.
Percent eluted by base, 5.1% in 3 hrs., 15 min.
Total percent eluted, 10.4% over 5 hrs., 45 min.

The above data was based on elution with simulated gastric juice and simulated intestinal juice at the rate of 50 cc. per hour.

A suitable dosage unit for 8-14 hour effectiveness of a pyrilamine sulphonic acid resin complex (IR-120) is 20 mg. to 200 mg. of pyrilamine base. An optimum dosage is 60 mg.

Another satisfactory antihistaminic sulphonic acid resin complex is the phenyltoloxamine resin complex.

The following examples will also illustrate the invention. In these examples the term IR-100 is a sulphonic acid cation exchanger having a 4-5 percent cross linked polyvinylstyrene nucleus, the term IR-111 is used to represent a carboxy-sulphonic acid cation exchange resin 4 to 6 percent cross linked acrylic acid polymer; the term IR-120 is used to represent the sulphonic acid cation exchange resin of Example 1, of Patent No. 2,366,007; the term XE-69 is the same as IR-120 but −80 mesh; and the term Dowex 16-50 is used to represent the sulphonic acid cation exchange resin identified as Dowex-50 in Industrial and Engineering Chemistry, vol 40, pp. 1350-1355 and in U.S. Patent No. 2,366,007.

*Example 8*

To 10 gms. of IR-100, cation exchange resin in the hydrogen cycle, suspended in 50 mls. of water, are added 5 gms. of phenyltoloxamine free base. The resulting mixture is shaken at frequent intervals, and allowed to stand at room temperature for three days. The aqueous phase is filtered off, and the resin complex washed twice with 25 mls. of acetone and dried.

*Example 9*

To 20 gms. of cation exchanger IR-120 in the hydrogen cycle are added approximately 9 gms. of phenyltoloxamine in the base form. After stirring for 7½ hours, the suspension is filtered and copiously washed with water, sucked dry, and allowed to air dry for two days. The resulting product contained by analysis 20.26 percent phenyltoloxamine base. The dissociation characteristics of this compound will be found in Summary 1, infra.

*Example 10*

To 10 gms. of cation exchange resin, XE-69 in the hydrogen phase, suspended in 200 mls. of water, are added 7½ gms. of phenyltoloxamine base. After stirring two hours, it was allowed to stand over night at room temperature. The next day it was stirred for an additional 90 minutes, filtered and washed with 1000 ml. of water. After filtration, it was allowed to dry at room temperature. Yield weight 17.3 gms. By analysis, it contained 46.29 percent phenyltoloxamine base. The dissociation study on this product will be found in Summary 2, infra.

*Example 11*

To 5 gms. of Dowex 16-50 in the hydrogen cycle suspended in 50 mls. of water is added 2 gms. of phenyltoloxamine free base. After shaking at frequent intervals for a five hour period, it is allowed to stand at room temperature for three days. It is then filtered and washed with approximately 750 ml. of water and once with 25 mls. of acetone, and air dried. By analysis, the product contained 19.67 percent phenyltoloxamine base.

In the following summaries the eluent used is the same as that described in the U.S. Pharmacopoeia, vol. XV, pp. 1094–1095, except for the omission of enzymes.

SUMMARY 1

Drug: Phenyltoloxamine base.
Complexing agent: IR-120.
Experimental results: Sample size 0.3233 gm. Equivalent to 65.5 mgm. of bristamine base.

| Sample No. | Eluent Used | Volume Collected, cc. | Time, min. | Mg. Eluted | Percent Eluted |
|---|---|---|---|---|---|
| 1 | Gastric Juice | 50 | 55 | 1.38 | 2.1 |
| 2 | do | 50 | 75 | 1.81 | 2.8 |
| 3 | do | 50 | 75 | 2.09 | 3.3 |
| 4 | Intestinal Juice | 50 | 45 | 1.59 | 2.4 |
| 5 | do | 50 | 30 | 1.54 | 2.3 |
| 6 | do | 50 | 70 | 2.36 | 3.6 |
| 7 | do | 50 | 60 | 1.26 | 1.9 |
| 8 | do | 50 | 60 | 1.54 | 2.4 |
| 9 | do | 50 | 65 | 1.79 | 2.7 |
| 10 | do | 50 | 65 | 1.79 | 2.7 |
| 11 | do | 50 | 80 | 1.54 | 2.4 |
| 12 | do | 50 | 60 | 0.4 | 0.67 |
| 13 | do | 50 | 30 | 1.37 | 2.10 |
| 14 | do | 50 | 30 | 0.83 | 1.30 |
| 15 | do | 50 | 90 | 1.3 | 1.9 |
| 16 | do | 50 | 60 | 1.4 | 2.1 |
| 17 | do | 50 | 90 | 1.2 | 1.8 |
| 18 | do | 50 | 90 | 1.2 | 1.8 |

This complex did not release at 10 percent of its amine in three hours with gastric juice and did not give satisfactory results except by the use of excessively high and impractical dosage amounts.

SUMMARY 2

Drug: Phenyltoloxamine.
Complexing agent: XE-69.
Experimental results: Sample Size 0.5152 gm. Equivalent to 238.3 mgm. of phenyltoloxamine.

| Sample No. | Eluent Used | Volume Collected, cc. | Time, min. | Mg. Eluted | Percent Eluted |
|---|---|---|---|---|---|
| 1 | Gastric Juice | 50 | 65 | 19.2 | 8.05 |
| 2 | do | 50 | 60 | 12.2 | 5.11 |
| 3 | do | 50 | 105 | 12.1 | 5.05 |
| 4 | Intestinal Juice | 50 | 60 | 8.9 | 3.75 |
| 5 | do | 50 | 30 | 4.3 | 1.85 |
| 6 | do | 50 | 60 | 5.5 | 2.30 |

Percent eluted by acid, 18.21% in 3 hours, 50 min.
Percent eluted by base, 7.87% in 2 hours, 30 min.
Total percent eluted, 26.08% over 5 hours, 20 min.

The dosage amount for the phenyltoloxamine resin complex, which releases not more than 50 percent of amine in one hour and at least 10 percent of amine in three hours when percolated with simulated gastric juice, is from twice to four times the amount of amine base that is present in the average dosage amount of phenyltoloxamine citrate. The optimum dose is 50 mg. and a suitable range for 8–14 hours effectiveness is 25–150 mg.

THE MANUFACTURE OF PHENYLTOLOXAMINE-RESIN-COMPLEX

Add 2 pints, 14 ozs. concentrated (36.5%) hydrochloric acid and 58 lbs., 10 ozs. of XE–69 to 36 gallons of deionized water and stir for 20 minutes. The pH should be approximately 2. Add 61 lbs., 8 ozs., 378 grs. of phenyltoloxamine dihydrogen citrate over 10–30 min. with stirring. The pH should be approximately 5. Stir for 2–3 hours and then allow to settle over night. Pump off supernatant and add water to form slurry, pump into filter bag and pull water to within one inch of top of cake with vacuum. Add more water and allow to stand for 15 minutes. Filter, and transfer the cake to trays and dry at 120° F. to 3 percent moisture. Pass dried material through No. 2 mesh screen.

MANUFACTURING PROCEDURE FOR PHENYLTOLOXAMINE RESIN CAPSULES

Add 61.5 lbs. dry phenyltoloxamine resin complex to 88.5 lbs. of starch and blend in mixer for 30 minutes. Analyze for phenyltoloxamine content and then fill into capsules.

MANUFACTURE OF PYRILAMINE-RESIN-COMPLEX

Add 1355 gms. wet IR–120 resin to 8 liters of distilled water with stirring. After 10 minutes, decant supernatant and add fresh water in same volume. Add 680.4 mgs. pyrilamine maleate and continue stirring for 8 hours. Allow mixture to stand over night, stir again for 1½ hours and allow to settle. Decant supernatant and save. Wash three times by stirring 10 minutes with 8 liters of water. Transfer to funnel and wash by suction with 30 liters of water. Dry in oven over night.

MANUFACTURING PROCEDURE FOR MIXED ANTIHISTAMINE RESIN COMPLEX CAPSULES

Mix 674.7 gms. phenyltoloxamine resin, 1441 gms. pyrilamine resin, 50 gms. magnesium stearate, and 3369.3 gms. dicalcium phosphate in blender for 30 minutes. Fill in brown capsules.

The basic idea of forming drug sulphonic acid resin adsorption compounds having a particle size and cross linkage such that not more than 50 percent of the drug would be eluted by .07 N HCl with .03 N NaCl or simulated gastric juice in one hour and the administering of these adsorption compounds in a unit dose containing a substantially greater amount of drug base than the normal unit dose for the drug base when used in the form of the common salt was extended to other drugs than the adrenergic amines and the antihistamines.

Some of the most important preparations developed were the compositions containing sulphonic acid resin adsorption compounds of narcotic nitrogen heterocyclic compounds such as morphine, methyl dihydromorphinone (Metopon), codeine, dihydrocodeine, and dihydrocodenone. The art had long desired analgesic and antitussive preparations which could be orally administered to a patient when the person retired in the evening and which would remain effective for at least eight hours. It was found that sulphonic acid cation exchange resins having a fine particle size of approximately 80 to 400 mesh and a cross linkage of one to 20 percent would react with morphine, Metopon, codeine, dihydrocodeine, and dihydrocodeinone to give adsorption compounds which would be effective 8 to 14 hours and which had the further advantage that they could be administered as suspensions or syrups. The cross linkages of one to 10 percent were faster acting in the fine particle size and for the narcotic basic morphine derivatives were found to be satisfactory and preferable to the high cross linkage resins. The coarser particle size resins such as 20–50 mesh were also satisfactory in one to 10 percent cross linkage but were slower acting and were too coarse for comfortable use in suspension.

The following disclosure and specific examples relating to narcotic resin complexes are given to illustrate other embodiments of suitable resin complexes and pharmaceutical preparations coming under my invention.

*Example 12*

The adsorption compound was prepared by suspending 8.00 gms. of dried IR–120 in the hydrogen cycle in about 100 mls. of distilled water and stirred for about 1 hour. Dissolve 5.00 gms. of dihydrocodeinone bitartrate in about 400 mls. of distilled water and add to resin slurry. Continue stirring for 3 hours.

The compound contained 26.22% by weight of dihydrocodeinone.

A sample of 1.000 gm. of the above resin adsorption compound equivalent to 262.2 mg. of dihydrocodeinone was tested for its hydrolyzing rate in simulated gastric juice (acid) and intestinal juice (base) with the following results:

Percent eluted by acid, 26.11% in 3 hrs.
Percent eluted by base, 36.81% in 6 hrs.
Total percent eluted, 62.92% over 9 hrs.

*Example 13*

The adsorption compound was prepared by dissolving 6.000 gms. of dihydrocodeine bitartrate in 100 ml. of water. pH 3.48. Adjust pH to 8 with .2 M NaOH. Mix for 10 minutes and then add 12.000 gms. of XE-69 in the hydrogen cycle. Mix for one and ½ hours. Wash and decant and dry over a week end.

The compound contained 19.16 percent by weight of dihydrocodeine.

A sample of .3158 gm. of the above resin adsorption compound equivalent to 60.50 mg. of dihydrocodeine was tested for its hydrolyzing rate in simulated gastric juice (acid) and intestinal juice (base) with the following results:

Percent eluted by acid, 98.60% in 3 hrs.
Percent eluted by base, 20.79% in 3 hrs.
Total percent eluted, 119.39% over 6 hrs.

*Example 14*

The adsorption compound was prepared by suspending 8.00 gms. of dried IR-120 resin in the hydrogen cycle in about 100 mls. distilled water and stirring for about one hour. Dissolve 5.00 gms. of codeine phosphate in about 200 mls. of distilled water and add to resin slurry. Continue stirring for about three hours.

The compound contained 27.50% by weight of codeine.

A sample of 1.000 gm. of the above resin adsorption compound equivalent to 275.0 mg. of codeine was tested for its hydrolysis rate in simulated gastric juice (acid) and intestinal juice (base) with the following results:

Percent eluted by acid, 29.43% in 3 hours.
Percent eluted by base, 40.63% in 8 hours.
Total percent eluted, 70.06% over 11 hours.

*Example 15*

The adsorption compound was prepared by slurrying 8.00 gms. of XE-69 resin in the sodium cycle with about 100 mls. of distilled water and stirring for ½ hour. Dissolve 5.00 gms. of codeine phosphate in a minimal amount of distilled water (about 7.00 mls.). Add slowly with stirring to the resin slurry. pH of reaction mass 4.90. Stir for six hours and allow to stand overnight. Filter off and wash well. Place in 60° oven to dry.

The compound contained 25.13 percent by weight of codeine.

A sample of 1.000 gm. of the above resin adsorption compound was tested for its hydrolyzing rate in simulated gastric juice (acid) and intestinal juice (base) with the following results:

Percent eluted by acid, 45.29% in 3 hours.
Percent eluted by base, 7.33% in 3 hours.
Total percent eluted, 52.62% over 6 hours.

Following is an example of a suitable narcotic resin syrup:

150 gms. dihydrocodeinone sulphonic acid resin complex made by the process of Example 12 except for the substitution of XE-69 for IR-120, are stirred into 500 ml. of 35 percent grain alcohol containing 200 grams of sucrose and 10 grams of carboxy methyl cellulose plus flavoring and coloring. After blending, the resultant suspension is diluted to one liter with water.

The compound which has superior antitussive effect over other morphine compounds is the resinous adsorption compound of dihydrocodeinone. The dosage unit as a cough suppressant for this preparation is a minimum of approximately 3 mgs. of preparation on the basis of dihydrocodeinone. The maximum dosage in order to avoid deleterious side effects, such as nausea, etc., is approximately 60 mgs. of the dihydrocodeinone.

The dihydrocodeinone resin adsorption compound is suitably given to the patient in 5 mg. amounts (on the basis of the amount of pure drug) once every 12 hours. Compare this with the normal dosage of 10 mg. of dihydrocodeinone bitartrate given every 2 to 4 hours, which dosage is not as effective as the resin compound.

The dihydrocodeine resinous adsorption compound for antitussive effect can suitably be used in amount containing from five to 100 mgs. of dihydrocodeine. For antitussive effect the daily dosage is about 20 mg. on the basis of the dihydrocodeine. For analgesia 10 mg. of the resin is administered orally once every 12 hours and gives superior effect over the normal daily dosage of 30 mg. of codeine phosphate every two to four hours.

The morphine in the morphine resin compound can suitably be present in from two to about 30 mgs. This compound has both high antitussive and analgesic effect, but because of its habit-forming characteristic is not often used. However, by the use of the resin the daily effective dose is greatly reduced.

The codeine resinous adsorption compound, like codeine itself, has some antitussive effect, but is particularly valuable as an analgesic. For this latter purpose it is suitably present in the resinous adsorption compound in from three mgs. to 60 mgs.

My invention includes sustained release tranquilizer and antispasmodic preparations. Applying the principles of particle size and cross linkage set forth above, amine tranquilizers and antispasmodics can be reacted with a sulphonic acid cation exchange resin to give an adsorption compound which can be used in a unit dosage amount substantially greater than the average dosage amount of the unadsorbed drug, such as in twice the average dosage amount or in an amount sufficient to last 8 to 16 hours and longer.

The following example of a specific antispasmodic adsorption compound is representative of what can be done for all such drugs by the practice of my invention.

The diphenyl-dimethyl-aminovaleramides sold under the trademark Centrine are potent anticholinergic and antispasmodic agents and are useful in the treatment of gastric ulcer, duodenal ulcer, pyloraspasm, and hypotropic gastritis.

These compounds generally in the form of sulphate salt are orally administered to the patient in solution, tablet, or capsule form.

The usual patient requirement for Centrine is about .5 mg. three to four times daily. If the amount is increased in order to decrease the number of dosages per day deleterious effects are obtained, and even with the dosage of .5 mg. three to four times daily phenobarbital is recommended for use with the Centrine.

Another object is to provide a resinous diphenyl-dimethyl-aminovaleramide compound which requires not more than two doses per 24 hours, and which even with such long time intervals does not result in the deleterious effects produced when one attempts to decrease the dosage period of the diphenyl-dimethyl-aminovaleramide compounds hitherto used, such as Centrine.

A further object is to provide a homogeneous anticholinergic and antispasmodic compound which without the necessity of complicated and expensive enteric coating procedures will release its drug action in small uniform amounts over a long period of time, so that there is no quick spurt of harmful release followed by quick depression. Instead, in applicant's product there is a plateau of uniform release of the diphenyl-dimethyl-aminovaleramide drug at an effective helpful level without reaching a harmful level.

It has been discovered that the above objects and advantages can be attained by reacting a diphenyl-dimethyl-aminovaleramide with a sulphonic acid cation exchange resin. There is thus obtained an adsorption compound consisting of the sulphonic acid cation exchange resin having adsorbed thereon (ionically bound) a cation of diphenyl-dimethyl-aminovaleramide.

The adsorption compounds of the present invention can be represented by the following formula, A representing the resin nucleus of a sulphonic acid cation exchange resin:

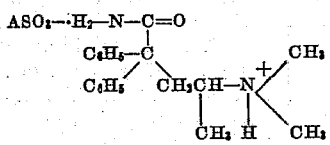

The anticholinergic and antispasmodic dosage unit for the above compound is a minimum of approximately .2 mg. of the compound on the basis of the diphenyl-dimethyl-aminovaleramide present. The maximum dosage in order to avoid deleterious side effects is approximately 10 mgs. of the aminovaleramide as the resinous adsorption compound given all at one time.

The water insoluble aminovaleramide compound of this invention is suitably given to the patient in .5 mg. amounts (on the basis of aminovaleramide) once every 12 hours as compared to the recommended doses of Centrine of .5 mg. three to four times daily.

The drug compound can be administered in capsule, tablet or in suspension, alone, or mixed with pharmaceutical carrier. Preferably it is mixed with a buffer. One suitable composition consists 5 mgs. of α,α-diphenyl-γ-dimethylaminovaleramide resin adsorption compound (about 20 percent aminovaleramide base) mixed with 250 mgs. of a buffer composed of aluminum hydroxide 225 parts by weight, magnesium hydroxide 150 parts by weight, and magnesium trisilicate 300 parts by weight.

The cross linkage of the sulphonic acid resins is substantially between 3 and 17 percent, and preferably 5 to 10 percent, in order to slow down the rate of diffusion of stomach and intestinal juices into the resin. Satisfactory rates of release of drug are obtained with particle size of between 20 to 50 mesh rather than at 100 mesh.

In the following examples IR-120 refers to a sulphonic acid cation exchange resin, 7 to 8 percent cross-linked, having a particle size such that substantially all particles pass through a 20 mesh screen and are retained on a 50 mesh screen, and made in accordance with Example 1 of U.S. Patent No. 2,366,007, except that 7.5 parts of divinyl benzene are used instead of 10 parts. XE-69 refers to the same resin as IR-120 except that substantially all particles pass through an 80 mesh screen and are retained on a 400 mesh screen.

The following examples will illustrate the invention:

*Example 16.*—Sulphonic acid cation exchange resin adsorption compound of Centrine (α,α-diphenyl-γ-dimethyl aminovaleramide)

The resin adsorption compound was prepared by suspending 3.0 gms. of IR-120 (H⁺) resin (dried) in 150 mls. of distilled water and stirring for one hour. There was then added 2.0 gms. of Centrine hydrogen sulphate (α,α-diphenyl-γ-dimethyl-aminovaleramide acid sulphate hydrate), and the mixture was stirred for four hours. The suspension medium was filtered off and the residue was washed with about 600 mls. of distilled water and dried overnight at 60° C. The final product was a sulphonic acid cation exchange resin having adsorbed thereon (ionically bound) 27.3 percent of Centrine (bound to the resin as the cation).

A sample of .500 gm. of the above resin adsorption compound equivalent to 136.7 mgm. of Centrine was tested for its hydrolysis rate in simulated gastric juice (acid) and intestinal juice (base) with the following results:

| Eluent Used | Volume Collected, ml. | Time, hr. | Mg. Eluted | Percent Eluted |
|---|---|---|---|---|
| Gastric Juice | 50 | 1 | 24.60 | 18.00 |
| Do | 50 | 2 | 14.27 | 10.44 |
| Do | 50 | 3 | 8.15 | 5.96 |
| Intestinal Juice | 50 | 4 | 7.55 | 5.52 |
| Do | 50 | 5 | 6.22 | 4.55 |
| Do | 50 | 6 | 5.85 | 4.28 |
| Do | 50 | 7 | 4.17 | 3.05 |
| Do | 50 | 8 | 3.00 | 2.19 |
| Do | 50 | 9 | 7.02 | 5.13 |

Percent eluted by acid, 33.96% in 3 hrs.
Percent eluted by base, 24.72% in 6 hrs.
Total percent eluted, 58.68% over 9 hrs.

*Example 17*

The procedure of Example 16 was repeated using XE-69 in place of the IR-120 resin. The results were substantially the same except that the product was of 80 mesh particle size instead of the larger 20 mesh particle size of the preceding example. Also, the analysis of Centrine ran 32.5%.

A sample of .342 gm. of the above resin adsorption compound equivalent to 111.1 mgm. of Centrine was tested for its hydrolyzing rate in simulated gastric juice (acid) with the following results:

| Eluent Used | Volume Collected, ml. | Time, hr. | Mg. Eluted | Percent Eluted |
|---|---|---|---|---|
| Gastric Juice | 50 | 1 | 45.18 | 40.67 |
| Do | 50 | 2 | 18.20 | 16.38 |
| Do | 50 | 3 | 9.97 | 8.97 |

Percent eluted by acid, 66.02% in 3 hrs.

Particularly satisfactory results as above disclosed have been obtained by reacting sulphonic acid cation exchange resins with Centrine compounds. Resin adsorption compounds have also been made by reacting Elorine sulphate (tri cycliamol sulphate) with sulphonic acid cation exchange resins. The combined product is substantially equivalent in effect to twice its quantity of the uncombined Elorine product and can be given to the patient in a similar manner to Elorine in one-half the normal Elorine dosage unit once every 12 hours instead of 3 to 4 times daily. A one-gram sample of the IR-120 Elorine adsorption compound (equivalent to 341.7 mgm. of Elorine) was eluted with gastric and intestinal juice with the following result:

| Eluent Used | Volume Collected, ml. | Time, hr. | Mg. Eluted | Percent Eluted |
|---|---|---|---|---|
| Gastric Juice | 50 | 1 | 13.12 | 3.84 |
| Do | 50 | 2 | 13.62 | 3.99 |
| Do | 50 | 3 | 12.82 | 3.75 |
| Intestinal Juice | 50 | 4 | 21.80 | 6.38 |
| Do | 50 | 5 | 32.25 | 9.44 |
| Do | 50 | 6 | 34.00 | 9.95 |
| Do | 50 | 7 | 26.05 | 7.62 |
| Do | 50 | 8 | 26.22 | 7.67 |
| Do | 50 | 9 | 20.87 | 6.11 |
| Do | 50 | 10 | 21.57 | 6.31 |

Percent eluted by acid 11.58% in 3 hrs.
Percent eluted by base 53.48% in 7 hrs.
Total percent eluted 65.06% over 10 hrs.

Sulphonic acid cation exchange resin adsorption products have also been prepared by reacting IR-120 and XE-69 in hydrogen form with the following compound:

TRASENTIN

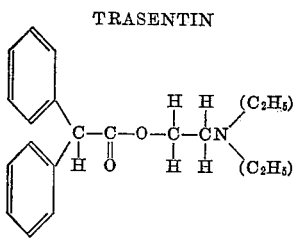

It has recently been discovered that within certain limiting dosage units and certain limiting concentrations that certain scopolamine alkyl halides, e.g. scopolamine methyl bromide, will remarkably reduce the volume and acidity of gastric secretion without producing untoward side reactions. This acivity, coupled with reduction in motility, renders such compositions extremely useful in the treatment of peptic ulcer and other gastro-intestinal disorders associated with hypersecretion and hypermotility. Such compositions also exhibited utility in the relief of ulcerated colitis and regional enteritis.

Therapeutic compositions containing scopolamine methyl bromide have been sold in the form of syrups and tablets. One form of such product is a syrup having a composition such that one teaspoonful contains 1.25 milligrams of the scopolamine methyl bromide. The recommended average dose is one to two teaspoonsfuls three or four times daily.

Another product on the market consists of white compressed tablets containing 2½ milligrams of scopolamine methyl bromide. The recommended average dose for such tablets is one table (2½ mg.) orally one-half hour before meals and one or two tablets (2.5 or 5 mg.) at bedtime.

The side effects from the administration of too large a quantity of scopolamine methyl bromide are typical of the anticholinergic drugs. The most frequent side effect is dryness of the mouth often accompanied by blurred vision and dizziness.

In order to minimize the untoward side effects the dosage unit for scopolamine methyl bromide in practice is from four to about 10 milligrams and the concentration of the active drug is regulated by means of carrier to from about .04 to about 12.15 percent per dosage unit. This gives almost complete selectivity of action, achieving relief from gastric hypersecretion and hypermotality free from untoward side reactions.

In the disclosure of Patent No. 2,753,288 the lower limit is given as about 2½ milligrams and an upper limit of 20 milligrams is stated. The 20 milligrams upper limit is nearly ten times that used in practice and it is almost the limit of safety rather than the limit of practical value.

An object of this invention is to provide alkyl scopolamine compositions which will have the same useful pharmaceutical effect as scopolamine methyl bromide but which can be administered to the patient in at least twice the amount on the basis of the active ingredient as can be administered for scopolamine methyl bromide with the same or lesser untoward side effects, thus making it possible to give fewer doses per day.

Another object is to provide a methscopolamine composition which can be administered to the patient only once a day instead of the usual three or four times per day for scopolamine methyl bromide.

Another object is to provide a water insoluble quaternary ammonium derivative of scopolamine which gives a slow release of scopolamine alkyl halide in the stomach and which passes into the intestines for further uniform slow release of the active drug.

The foregoing and additional objects have been accomplished by reacting scopolamine lower alkyl salts with cation exchange resins, particularly with sulphonic acid cation exchange resins, and preferably using resins having a particle size of between —80+400 mesh. The novel compounds produced by this reaction are water insoluble salts in which the anion of the water soluble scopolamine alkyl salt such as, for example, the halide or nitrate of the scopolamine alkyl salts, is replaced by the anion of the cation exchange resin. These materials can be represented by the following structural formula:

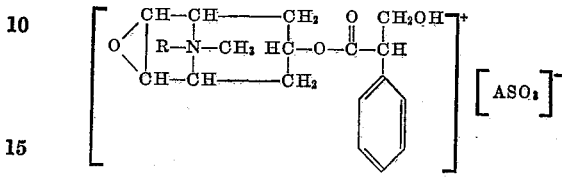

wherein R is a lower alkyl group, such as methyl, ethyl, propyl, and butyl, and A is a resin nucleus of a sulphonic acid cation exchange resin.

The compounds of this invention are water insoluble quaternary ammonium salts of scopolamine. The compound above referred to can also be referred to as a sulphonic acid cation exchange resin having adsorbed thereon (or ionically bound thereto) a cation of a scopolamine lower alkyl salt. The cation, of course, is the same regardless of the type of salt and thus may be the cation of scopolamine lower alkyl chloride, bromide, nitrate, or the like.

The compounds of this invention can be readily made by reacting a cation exchange resin with a solution of the scopolamine lower alkyl salt, such as, for example, by contacting a sulphonic acid cation exchange resin with an aqueous solution of scopolamine lower alkyl chloride.

All types of cation resins will react with scopolamine lower alkyl salts. The carboxylic type cation exchange resins are well known and will react with the scopolamine quaternary salts to give water insoluble resinous adsorption compounds. However, such compounds hydrolyze too quickly with the gastric juices of the stomach and are little, if any, better than the unadsorbed scopolamine compound itself. On the other hand, sulphonic cation exchange resins react with the scopolamine lower alkyl salts to give water insoluble quaternary compounds which satisfy the objects of this invention.

The resin adsorption compounds of this invention are preferably substantially saturated with the drug. Saturation will generally run from about 10 percent to 50 percent, depending upon the drug and the time of contact with the sulphonic acid cation exchange resin. However, the resin does not necessarily have to be saturated, and as little as 1.0 percent and less of the adsorption drug can be present.

The resin adsorption products can be readily made by agitating the ingredients suspended in water until the reaction is complete.

The following disclosures and specific examples relating to quaternary scopolamine and atropine resin complexes are given to illustrate other embodiments of suitable drug complexes and preparations coming under my invention.

*Example 18*

To 48 grams of moist Amberlite IR-120 resin (25 grams dry resin) suspended in distilled water was added 19.3 grams of scopolamine methyl nitrate. The mixture was stirred for six hours and dried for 18 hours at 50° C., and was found to contain 32.6 percent of methyl scopolamine.

The product was a water insoluble quaternary ammonium salt of scopolamine in which the methyl scopolamine cation is ionically bound to the anion of the sulphonic acid cation exchange resin, as shown by the representative formula above.

The sulphonic acid groups of the sulphonic acid cation exchange resin were substantially saturated; that is, all of the groups were substantially completely reacted with the scopolamine lower alkyl salt. The product was washed with water before analysis to remove unreacted scopolamine salt. However, the test showed that minor proportions of unreacted scopolamine lower alkyl halides or nitrates could be present with the adsorption compound, although such unreacted material should be kept at a minimum, as such material decreases the amount of adsorption product which can be used without obtaining deleterious side effects. Likewise, as above pointed out, the sulphonic acid groups need not all be reacted with the scopolamine alkyl quaternary salt, the result of such unsaturation being, mainly, that greater amount of the adsorption product is required for equal results.

The saturated product obtained in accordance with the above procedure of Example 18 was subjected to gastric and intestinal fluid tests. The resins were eluted with simulated gastric juice and simulated intestinal juice and the amount of methyl scopolamine analyzed for various periods of elution. The following Table XVIII shows the results of tests made on several adsorption products in accordance with the process of Example 18:

TABLE XVIII

| Resin Description | Percent | Sample Size | Gastric Juice Elution | | | Total | Intestinal Juice Elution | | | Total | Total Percent Eluted |
|---|---|---|---|---|---|---|---|---|---|---|---|
| | | | 1st hr. | 2nd hr. | 3rd hr. | | 1st hr. | 2nd hr. | 3rd hr. | | |
| XE-69 | 22.9 | 99.2 | 35.0 | 16.0 | 8.3 | 59.3 | 8.0 | 5.9 | 3.0 | 10.9 | 76.2 |
| IR-120 | 26.25 | 101 | 20.2 | 10.8 | 8.2 | 39.2 | 6.9 | 6.3 | 4.9 | 18.1 | 57.3 |
| IR-120 | 32.6 | 108.5 | 17.9 | 10.8 | 8.3 | 37.1 | 7.6 | 6.8 | 4.7 | 19.1 | 56.2 |

In the above table the percent is the weight percent of methyl scopolamine in the adsorption compound. The sample size is in milligrams. The amounts eluted are in milligrams of methyl scopolamine. The terms XE-69 and IR-120 are sulphonic acid cation exchange resins as described in the specification.

The slow uniform release of the methyl scopolamine drug from the sulphonate type adsorption compound, due to its hydrolysis with the gastric juices and intestinal juices, is clearly shown in Table XVIII. It is likewise shown that the larger particle size adsorption compound obtained with the IR-120 resin releases the drug at a slower rate than the smaller particles size adsorption compound obtained with the XE-69 resin.

The product of this invention was tested on mice and rats to compare it with scopolamine methyl bromide and scopolamine methyl nitrate. It was found that it was impossible to give sufficient amount of the resin complex to reach the LD-50 but the experimental data obtained indicated that the adsorption compound (resin complex) is more than four times less toxic than the uncombined scopolamine methyl bromide or nitrate.

The dosage unit of methscopolamine adsorption compound for human patients can range from about two milligrams to about 80 milligrams on the basis of the methyl scopolamine cation in the adsorption product. At above 80 milligrams the side effects are so serious that the product cannot be regarded as safe. This corresponds to the effect obtained by the use of about 20 milligrams of scopolamine methyl bromide mixed with a carrier. It is preferred to use adsorption compound to give from three to 50 milligrams of methyl scopolamine. It is not necessary to mix a carrier with the adsorption compound, although this may be done. Of course, it is generally practiced in making syrups, tablets, or capsules. It has also been found by actual clinical tests that one tablet or capsule containing sufficient adsorption compound to give from five to 50 milligrams of methyl scopolamine is a suitable daily dosage to achieve the desired results without untoward side effect. Preferably the daily dosage in a single dosage unit is one capsule in the morning containing adsorption compound equivalent to five to 20 milligrams of methyl scopolamine followed 12 hours later by another dosage unit of the same amount.

Of course, smaller dosage units can be given by increasing the frequency of administration. Less adsorption compound corresponding to 2½ milligrams of methyl scopolamine with only about 1/100 percent of methyl scopolamine can be given and is effective for a short period of time.

The maximum concentration of the methyl scopolamine can run to about 10 percent by weight of the composition by mixing the methyl scopolamine adsorption compound with unadsorbed methyl scopolamine. This can be accomplished by contacting the sulphonic acid cation exchange resin with a liquid suspension of the quaternary ammonium salt for such a time as will substantially saturate the sulphonic acid groups, and then adding additional quaternary ammonium salt to the saturated adsorption compound. The amount of the combined quaternary ammonium salt in the adsorption compound to obtain saturation can vary widely by using sulphonic acid cation exchange resins having different capacity for bases and also by using such cation exchange resins which are ordinarily partially saturated with a base other than the quaternary ammonium base. In this way the concentration of combined quaternary ammonium cation in the adsorption compound can vary from approximately 10 percent to 50 percent of the adsorption compound. The additional quaternary ammonium salt can vary within wide limits but in order to obtain the desirable initial quick acting effect without losing the advantage of large initial safe dosage the amount of unadsorbed quaternary ammonium salt should vary from about one percent to 50 percent of the total composition. This is true for the methyl scopolamine, ethyl scopolamine, methyl atropine, and ethyl atropine adsorption compounds, and according to tests on a representative number of other quaternary ammonium therapeutic compounds is a suitable range for other quaternary ammonium salts and adsorption compounds in general.

The resin adsorption compounds of this invention can be used as such or they can be mixed with non-toxic carriers which may be either a solid material or liquid. Bland carriers are, of course, much preferred. The compositions can take the form of tablets, powders, capsules, liquid suspensions, or other dosage forms which are particularly useful for oral administration. Liquid diluents are employed for oral use. Such a medium can be a solvent such as water. The only basic limitations on the liquid diluent used are compatibility and palatability. The compositions can take the form of scopolamine lower-alkyl adsorption compounds, admixed with solid diluents and/or tableting adjuvants such as cornstarch, lactose, talc, stearic acid, magnesium stearate, gums, or the like. Any of the tableting materials used in pharmaceutical practice can be employed where there is no incompatibility with the scopolamine lower-alkyl adsorption compound. The material can be tableted with or without coactive materials. Alternatively, the scopolamine lower-alkyl adsorption compound with its adjuvant material can be placed in the usual capsule of resorbable material, such as the usual gelatine capsule, and administered in that form. In yet another embodiment, a powdered scopolamine lower-alkyl adsorption compound can be prepared in the form of a suspension in a material in which it is not soluble; the scopolamine lower-alkyl adsorption compound can be combined with human or animal feeds of various kinds; the scopolamine lower-alkyl adsorption compound can be prepared in the form of a laminated tablet for prolonged action.

The scopolamine lower-alkyl adsorption compound can also be combined with an antacid to provide a more complete therapy for peptic ulcer and the like; the scopolamine lower-alkyl adsorption compound can be combined with phenobarbital to provide relief for nervous reactions as well as peptic ulcer; the scopolamine lower-alkyl adsorption compound can be combined with an anti-proteolytic agent such as protamine sulphate, soy bean trypsin inhibitors, trypsin inhibitor fraction from blood, or the like; the scopolamine lower-alkyl adsorption compound can be combined with an anti-hemorrhagic and coagulant preparation such as thrombin, gelatin, vitamin K, carboxy-methylcellulose, methylcellulose or the like for use in the acute hemorrhagic stage of gastro-intestinal ulcer; the scopolamine lower-alkyl adsorption compound can be combined with hormonal substances, such as cortisone, or the like, which has a tendency to produce or aggravate gastro-intestinal ulcers; the scopolamine lower-alkyl compound can be combined with local anesthetics effective in the gastro-intestinal tract, such as procaine hydrochloride, benzocaine, or the like; the scopolamine lower-alkyl adsorption compound can be combined with a carbonic anhydrase inhibitor, such as 2-acetyl-amino-1,3,4-thiodiazole-5-sulphonamide; the scopolamine lower-alkyl adsorption compound may be combined with any other adjuvant; or, combinations of the foregoing can be provided.

It has been found desirable in many cases to form a molecularly mixed adsorption compound instead of simply mixing the methyl scopolamine adsorption compound mechanically with the other materials. These are obtained by partially saturating the cation resin with the methyl scopolamine, followed by completing the saturation with another amine, such as codeine.

The following examples illustrate the preparation of some compositions useful in the treatment of patients by oral administration:

*Example 19*

[Tablet (five milligrams; ca. 5.1 percent)]

For a batch of 1000 tablets, five grams of scopolamine methyl adsorption compound and 84 grams of lactose were intimately mixed as fine powders, and granulated with an aqueous solution of 2.6 grams of sucrose. After drying, the granules were lubricated with 4.9 grams of starch and 1.3 grams of calcium stearate and compressed into tablets on a tablet machine.

The individual tablets thus produced contained the following quantities of ingredients:

Scopolamine methyl adsorption compound _____milligrams__ 5
Lactose _____grains__ 1.3
Sucrose _____do____ 0.04
Starch _____do____ 0.075
Calcium stearate _____do____ 0.02

*Example 20*

[Tablet (ten milligrams; ca. 9.0 percent)]

In a manner similar to that shown in Example 19, ten milligram dosages can also be prepared.

Scopolamine methyl adsorption compound _____milligrams__ 10
Lactose _____grains__ 1.4
Sucrose _____do____ 0.04
Starch _____do____ 0.1
Calcium stearate _____do____ 0.02

*Example 21.—Liquid preparation*

(a) Scopolamine methyl adsorption compound was suspended in water; sucrose, sucaryl, sodium phosphate and citric acid were added; and the mixture stirred until all soluble ingredients are dissolved. The glycerin was added, and all were mixed thoroughly to produce an oral liquid suspension.

| | Each milliliter contains— | 1,000 milliliters contain— |
|---|---|---|
| Scopolamine methyl adsorption compound. | 1 milligram | 1.0 gram. |
| Sucrose U.S.P | 65 percent | 650.0 grams. |
| Sucaryl Sodium | 0.228 percent | 2.28 grams. |
| Sodium Phosphate Dibasic (Na₃HPO₄). | 0.15 percent | 1.5 grams. |
| Citric Acid U.S.P | 0.1 percent | 1.0 gram. |
| Glycerin | 10 percent | 100.0 milliliters. |
| Deionized Water, q.s. ad | | 1,000.0 milliliters. |

One teaspoon of this preparation gives about a five milligram dose and amounts to about 0.1 percent by weight of scopolamine methyl adsorption compound.

(b) In the manner shown in 21(a) supra, a liquid preparation containing scopolamine ethyl adsorption compound is prepared by substituting scopolamine ethyl adsorption compound for scopolamine methyl adsorption compound.

*Example 22.—Elixir*

The soluble dry ingredients listed below were dissolved in a mixture of alcohol, glycerin, and water and mixed thoroughly to produce a high alcoholic content elixir. Then the appropriate amount of the methyl scopolamine adsorption compound is added and thoroughly mixed.

| | Each milliliter contains— | 1,000 milliliters contain— |
|---|---|---|
| Methyl scopolamine adsorption compound. | 1 mg | 1.0 gram. |
| Alcohol (95%) U.S.P | 18% | 190 milliliters. |
| Glycerin | 9.3% | 93 milliliters. |
| Sucrose U.S.P | 11% | 110 grams. |
| Sodium Benzoate | 0.22% | 2.2 grams. |
| Deionized Water, q.s. ad | | 1,000 milliliters. |

One teaspoon of this preparation gives about a five milligram dose of scopolamine methyl adsorption compound. This elixir contains about 0.1 percent scopolamine methyl adsorption compound.

*Example 23.—Low alcohol elixir*

Scopolamine methyl adsorption compound, methylparaben, and propylparaben are suspended in alcohol and stirred into a mixture of 100 milliliters of water, glucose and sugar. Water was added to make 500 milliliters. The product is a pleasant tasting colorless elixir of low alcoholic content.

500 milliliters
0.1% scopolamine methyl adsorption product _____grams__ 0.5
1.5% alcohol 95% U.S.P. _____milliliters__ 7.0
61% sucrose (cane sugar) _____grams__ 305.0
0.15% methylparaben _____do____ 0.75
0.037% propylparaben _____do____ 0.185
Deionized water, q.s. ad _____milliliters__ 500
15% glucose syrupy U.S.P. _____grams__ 75.0

One teaspoon of this preparation gives about a five milligram dose of scopolamine methyl cation in the adsorption compound.

*Example 24.—Antacid tablets*

(a) Tablets of scopolamine methyl adsorption compound and an antacid are prepared as follows: The scopolamine methyl adsorption compound, aluminum hydroxide gel dried, magnesium trisilicate, saccharin and dextrin are intimately mixed as fine powders and granulated with an aqueous solution of starch and sucrose. After drying, the granules are lubricated with starch and magnesium stearate and compressed into tablets on a tablet machine.

Per tablet

| | |
|---|---|
| Scopolamine methyl adsorption compound _____milligrams__ | 2.5 |
| Aluminum hydroxide gel dried U.S.P. ____grains__ | 13.07 |
| Magnesium trisilicate powder U.S.P. _____do____ | 5.0 |
| Saccharin soluble powder U.S.P. _____do____ | 0.01 |
| Dextrin white bolted _____do____ | 2.0 |
| Starch _____do____ | 0.28 |
| Sucrose _____do____ | 0.9 |
| Magnesium stearate powder _____do____ | 0.12 |

One tablet supplies about a 2.5 milligram dose and contains about .18 percent by weight of scopolamine methyl adsorption compound.

(b) In the manner shown in 24(a) supra, antacid tablets containing scopolamine ethyl adsorption compound are prepared by substituting scopolamine ethyl adsorption compound for scopolamine methyl adsorption compound.

*Example 25.—Liquid antacid preparation*

A liquid oral preparation of scopolamine methyl adsorption compound and an antacid is prepared by suspending scopolamine methyl adsorption compound in part of the water containing glycerin, and propylene glycol. The hydrated alumina gel and magnesium trisilicate are added and passed through a colloid mill until uniform. The resulting colloidal suspension is assayed. The produce is standardized to thirty grains Al(OH)₃ and sixty grains magnesium trisilicate with q.s. deionized water to make up one fluid ounce.

| | Each fluid ounce contains— | 1,000 milliliters contain— |
|---|---|---|
| Scopolamine methyl adsorption compound | 12.5 mg | 422.7 milligrams. |
| Hydrated Alumina Gel | (30 grains) | 1.014 grains. |
| Propylene Glycol U.S.P. | 2 percent | 20 milliliters. |
| Glycerin U.S.P. | 3 percent | 30 milliliters. |
| Magnesium Trisilicate | 60 grains | 131.5 grams. |
| Deionized water | | q.s. |

Since the water content of alumina gel varies, a quantity of hydrated gel equivalent to thirty grains per fluid ounce of Al(OH)₃ in the final product is used.

In order to obtain the most effective doses of the antacids in the above preparation, about one tablespoon is given. This supplies about 6.25 milligrams and amounts to about .04 percent by weight of scopolamine methyl adsorption compound.

*Example 26.—Liquid phenobarbital preparation*

| | Each milliliter contains— | 1,000 milliliters |
|---|---|---|
| Scopolamine methyl adsorption compound | 1 milligram | 1.0 grams. |
| Phenobarbital U.S.P. | 0.06 grain | 3.88 grams. |
| Alcohol (95%) U.S.P. | 14 percent | 150.0 milliliters. |
| Propylene Glycol | 25 percent | 250.0 milliliters. |
| Sucrose U.S.P. | 12.75 percent | 127.5 grams. |
| Saccharin Soluble | 0.01 percent | 0.1 grams. |
| Amaranth | 0.01 percent | 0.1 grams. |
| Deionized Water | q.s. | q.s.ad.1,000.0 milliliters. |

Phenobarbital and scopolamine methyl adsorption compound were suspended in alcohol. Propylene glycol and deionized water were added to make up 500 milliliters. The remaining ingredients were added and stirred into the mixture, with water being mixed in thoroughly to make up 1,000 milliliters. The recommended minimum dose is approximately one teaspoon which contains about five milligrams or 0.1 percent of scopolamine methyl adsorption compound.

In the above examples the scopolamine methyl adsorption compound used was the compound produced by the process of Example 18, that is a water insoluble quaternary ammonium salt of scopolamine having a methyl scopolamine cation ionically adsorbed on the sulphonic acid cation exchange resin. XE-69 was used to produce the adsorption compound used in the liquid suspension of the examples and IR-120 in all other examples. The percentage of methyl scopolamine adsorbed was 26.25%. However, it is of course realized that this was simply an example of one type of cation exchange resin which was satisfactory, it being understood that the examples and the particular cation exchange resin used in the example is merely illustrative and that considerably lower and also higher percentages of adsorbed methyl scopolamine could be present within the limits of safe and effective dosage as hereinbefore indicated.

The sulphonic acid cation exchange resin having methyl atropine adsorbed thereon has the same therapeutic utility as methyl atropine but has the advantage over methyl atropine in that it can be administered to a patient in much larger dosages without deleterious side effects, making it possible to administer this product to the patient only twice per 24-hour day, such as, for example, once in the morning and once in the evening. The maximum dosage unit for the sulphonic acid cation exchange resin product of methyl atropine is about 100 milligrams on the basis of the methyl atropine. The concentration can be 70 percent or higher when the adsorption compound is mixed with the methyl atropine bromide or nitrate, but ordinarily there is no necessity of mixing the adsorption compound with the water soluble salt so that the concentration of the combined methyl atropine in the adsorption compound does not exceed 40 percent and may be lower, depending upon the capacity of the sulphonic cation exchange resin. The minimum dosage to be effective is approximately two milligrams.

Another suitable therapeutic preparation contains a sulphonic acid cation exchange resin ionically combined with an aliphatic quaternary drug having hypotensive action.

The following example illustrates a suitable adsorption compound for this purpose:

*Example 27*

Two gms. of hexamethonium chloride in 25 ml. of water were placed onto five gms. of cation exchanger, IR-120, in the hydrogen phase. After standing, for several hours, the resin was filtered, washed with copious amounts of water, and air dried. The resulting resin complex contained 25 percent of hexamethonium base as estimated by the Kjeldahl nitrogen method. The disassociation of this complex in artificial gastric and intestinal juice is illustrated in the following summary:

EXPERIMENTAL RESULTS

Sample size: 1.5 gm. resin complex. Equivalent to 345.6 mgm. of drug.

| Sample No. | Eluent Used | Volume Collected, ml. | Time, min. | Mg. Eluted by N₂ Determination | Percent Eluted |
|---|---|---|---|---|---|
| 1 | Artificial Gastric Juice. | 145 | 180 | 55.54 | 16.1 |
| 4 | Artificial Intestinal Juice. | 144 | 180 | 42.14 | 12.2 |

Percent eluted by acid, 16.1% in 3 hrs.
Percent eluted by base, 12.2% in 3 hrs.
Total percent eluted, 28.3% in 6 hrs.

The sulphonic acid cation exchange resin complexes of hexamethonium and other ganglionic blocking quaternary amines, such as pentamethonium, tetraethylammonium, and pentolinium, can be administered orally to a patient in capsule, tablet or syrup form like hexamethonium chloride and like compounds, the patient, however, being able to take larger dosages at one time, such as, for example, the full dose for one day given at one instead of at several intervals of time.

Methods for determining the rate of elution of drugs from drug resin complexes:

I. THE PERCOLATION METHOD (STANDARD TEST UPON WHICH CLAIMS ARE BASED)

This method utilizes a piece of equipment containing a 25 millimeter coarse, sintered glass disk sealed to a glass reservoir located approximately 12 inches above it. Underneath the reservoir is connected a stopcock which is utilized to regulate the flow of the gastric or intestinal juice which is placed in the reservoir, so that it percolates through the disk at a rate of 50 ml. per hour. A weighed sample of the resin complex equivalent to 100 mgs. of the drug calculated as the base is placed on the sintered glass disk and three successive 50 ml. portions of simulated gastric juice are permitted to percolate through it over a period of one hour each. The portions are each collected for analysis. After the third 50 ml. portion of gastric juice is collected, the fluid above the resin complex is replaced with simulated intestinal juice, and collection is made of the intestinal juice passing through the resin complex for three successive hours at the rate of 50 m'. per hour. All six samples are then analyzed for their drug content by means of the ultra-violet adsorption spectrum utilizing the proper standard drug curve and reading the samples at the appropriate wave length. The amount of drug appearing in each 50 ml. portion is then calculated in terms of the percent of the total drug which was initially used.

II. BATCH ELUTION METHOD (QUICK, CONVENIENT TEST NOT AS CLOSE TO ACTUAL BODY CONDITIONS)

A five gram sample of the drug resin complex is placed in 400 ml. of simulated gastric juice. The mixture is stirred at room temperature for a period of 60 minutes when it is filtered and the filtered solution analyzed for its drug content by spectroscopic means using the appropriate wave length, standard curves, and blanks. The amount of drug eluted is calculated in terms of percent of the total drug in the five gram sample of drug resin complex used.

The terms "simulated gastric juice" and "simulated intestinal juice" as used in this specification mean the simulated gastric juice less enzymes and simulated intestinal juice less enzymes described in the U.S. Pharmacopoeia, vol. XV, pp. 1094–1095 except for the omission of enzymes. The simulated gastric juice consists essentially of .07 N HCl containing .03 N NaCl. The simulated intestinal juice consists essentially of .039 N NaOH and .05 N $KH_2PO_4$.

It is contemplated that phosphonic acid cation exchange resins can be used in place of sulphonic acid cation exchange resins in the preparation of the adsorption compounds of this invention and that such compounds will give substantially the same results.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. A pharmaceutical preparation for oral administration to a patient, comprising in dosage unit form a therapeutically effective amount of cross linked sulphonic acid cation exchange resin having a gastro-intestinal absorbable pharmaceutical organic drug containing a basic nitrogen group ionically bound to the resin to form an adsorption compound; the cross linkage of the resin of the adsorption compound being between approximately one to twenty percent and the particle size of the adsorption compound being between approximately 10 mesh and 400 mesh, and the cross linkage and particle size being such that not more than approximately 50 percent of the bound drug is released in one hour by elution with .07 N HCl and .03 N NaCl and at least approximately 10 percent is released in three hours, the amount of bound drug in the dosage unit being between .2 to 2000 milligrams calculated as drug base and being in sufficient amount as to be safely effective for a period of at least eight hours and the said drug in base form having an oral LD–50 in rats of between aproximately 50 to 3000 milligrams per kilogram.

2. The preparation of claim 1 wherein the organic drug is a heterocyclic nitrogen compound.

3. The preparation of claim 1 in which the bound drug is present in at least two percent by weight of the adsorption compound.

4. The preparation of claim 3 in which the unit dose of the adsorption compound calculated as drug base is at least twice the average unit dose for the orally administered free base.

5. A therapeutic preparation comprising in dosage unit form particles of cross linked sulphonic acid cation exchange resin having ionically bound to the resin a pharmaceutical amine, said amine being of a type whose hydrochloride salt is absorbable in the gastro-intestinal tract and has an oral LD–50 in rats of approximately 50 to 3000 milligrams per kilogram, the cross linkage of the resin being between approximately one to twenty percent and the particle size being between approximately 10 and 400 mesh, the cross linkage and particle size of the sulphonic acid resin being such that not more than approximately 50 percent of the bound amine is released in one hour by elution with a mixture of .07 N HCl and .03 N NaCl, and the total amount of bound amine calculated as amine base in the dosage unit being between approximately .2 to 2000 milligrams and being in sufficient amount as to be safely effective for a period of at least eight hours.

6. The preparation of claim 5, in which the bound amine is present in at least two percent by weight of the adsorption compound.

7. A pharmaceutical amine preparation for oral administration to a patient, comprising in dosage unit form particles of a sulphonic acid cation exchange resin having an organic drug containing a basic nitrogen group ionically bound thereto to form an adsorption compound and distributed within the interstices of the resin, the cross linkage of the resin of the adsorption compound being between approximately one to twenty percent and the particle size of the compound being between approximately 10 mesh and 400 mesh, and the cross linkage and particle size being such that not more than 50 percent of the bound amine is released in one hour by elution with a mixture of .07 N hydrochloric acid and .03 N sodium chloride, and at least approximately 10 percent is released by such elution in three hours, the drug being of a type which is absorbable in the gastro-intestinal tract and when orally administered to a human in its base or common salt form in an amount sufficient to be therapeutically effective throughout a period of 12 hours has undesirable side effects and normally is orally administered to the patient in a smaller unit amount at least twice in 12 hours, the amount of bound drug in the dosage unit being between .2 to 2000 milligrams calculated as drug base and sufficient to be safely effective throughout a period of at least approximately eight hours.

8. A therapeutic preparation comprising in dosage unit form particles of a cross linked sulphonic acid cation exchange resin having amphetamine ionically bound to the resin to form an adsorption compound, the cross linkage of the resin of the adsorption compound being between one to twenty percent, the particle size of the adsorption compound being between approximately 10 mesh and 400 mesh, and the cross linkage and particle size being such that not more than approximately 50 percent of the amphetamine is released in one hour by elution with simulated gastric juice and at least approximately 10 percent in three hours by said elution, the total amount of bound amphetamine calculated as amphetamine base in the dosage unit being between approximately five milligrams and 60 milligrams, the amphetamine being present in the adsorption product in at least two percent by weight.

9. In a method of orally administering a drug to a human being, wherein the drug is an organic compound containing a basic nitrogen group and in its base or water soluble salt form is of the type which is absorbable in the gastro-intestinal tract and has an oral LD–50 in rats of 50 to 3000 milligrams per kilogram, the improvement which comprises orally administering the drug in a unit dose containing a therapeutically effective amount of cross linked sulphonic acid cation exchange resin having the said drug ionically bound to the resin to form an adsorption compound, the cross linkage of the resin of the adsorption compound being between approximately one to twenty percent and the particle size of the compound being between approximately 10 mesh and 400 mesh, and the cross linkage and particle size being such that not more than approximately 50 percent of the bound drug is released in one hour by elution with .07 N HCl and .03 N NaCl and at least approximately 10 percent is released in three hours, the total amount of bound drug calculated as the drug base in the dosage unit being between approximately .2 to 2000 milligrams.

10. The method of claim 9 wherein the dosage amount of the bound drug is at least twice the average unit dose for the said drug in its base and common salt form.

11. In a method of orally administering an amine drug to a human being, wherein the amine drug in its soluble salt form is absorbable in the gastro-intestinal tract and is of the type normally administered in unit amounts at least twice during a 12 hour period to obtain a suitable therapeutic effect without undesirable side effects, the improvement wherein the drug can be administered in sufficient amount to be effective for at least eight hours without side effects which comprises orally administering the amine drug in a unit dose in the form of particles of a cross linked sulphonic acid cation exchange resin having the said amine drug ionically bound to the resin to form an adsorption compound, the cross linkage of the resin of the adsorption compound being between approximately one to twenty percent and the particle size of the adsorption compound being between approximately 10 mesh and 400 mesh, and the cross linkage and particle size being such that not more than approximately 50 percent of the bound amine is released in one hour by elution with .07 N HCl and .03 N NaCl and at least approximately 10 percent is released in three hours, the total amount of bound amine calculated as amine base in the dosage unit being between approximately .2 to 2000 milligrams and in an amount which is safely effective for at least eight hours.

12. The method of treating a patient with an adrenergic amine to provide immediate action and sustained effectiveness for a period of at least eight hours which comprises orally administering to the patient only once during an eight-hour period a composition in unit dosage form consisting essentially of particles of a cross linked sulphonic acid cation exchange resin having an adrenergic amine ionically bound to the resin to form an adsorption compound, said adsorption compound having a cross linkage of the resin of approximately 5 percent to 17 percent, the size of the particles of adsorption compound which have a cross linkage of 5 percent to 9 percent being substantially in the range of 10 to 50 mesh, and the size of the particles of adsorption compound having a cross linkage of above 9 percent being finer than 50 mesh, the total amount of bound drug calculated as amine base being between approximately 5 to 200 milligrams, and in an amount such as to be safe and effective over a period of at least eight hours, the proportion of the combined amine in the adsorption compound calculated as amine base being at least 2 percent by weight of the adsorption compound.

13. The method of claim 12 where the amine is amphetamine and the dosage amount is from 5 to 60 milligrams of bound amphetamine.

14. An adrenergic composition adapted to give immediate action and sustained effectiveness during at least an eight-hour period when orally administered to a human patient, said composition consisting essentially of particles of a cross linked sulphonic acid cation exchange resin having a substance selected from the group consisting of beta phenalkyl amines and beta phenyl beta hydroxy alkyl amines ionically bound thereto to form an adsorption compound, said adsorption compound having a cross linkage of the resin of approximately 5 percent to 17 percent, the size of the particles of adsorption compound having a cross linkage of 5 percent to 9 percent being substantially in the range of 10 to 50 mesh, and the size of the particles of adsorption compound having a cross linkage of above 9 percent being finer than 50 mesh, the percent of combined amine calculated as amine base being at least 2 percent of the adsorption compound.

15. The composition of claim 14 wherein the amine is amphetamine, the sulphonic acid cation exchange resin is a polyvinyl aryl sulphonic acid cation exchange resin cross linked to the extent of 5 percent to 9 percent with divinylbenzene, and the particle size of the adsorption compound is from substantially 10 to 50 mesh.

References Cited in the file of this patent

UNITED STATES PATENTS 2,498,687    Larsen _____ Feb. 28, 1950

OTHER REFERENCES

Saunders: J. of Pharm. and Pharmacology, 5:9, September 1953, pp. 569–579.

Martin and Sullivan: Am. J. of Pharm., February 1950, pp. 48–52.

Mukherjee: J. Indian Chemical Soc. 27:4, April 1950, pp. 156–168.

Winters: Reprint from Drug and Allied Industries, July 1950 (6 pp.).

Hamlow: J. Am. Pharm. Asso. (Sci. Ed.), vol. 43, August 1954, pp. 460–464.

Saunders: J. Pharm. and Pharmacology 6:1, January 1954, pp. 32–37.